US012562123B2

(12) United States Patent
Shin et al.

(10) Patent No.: US 12,562,123 B2
(45) Date of Patent: Feb. 24, 2026

(54) DISPLAY DEVICE

(71) Applicant: Samsung Display Co., LTD., Yongin-si (KR)

(72) Inventors: Dong Hee Shin, Yongin-si (KR); Sang Yong No, Yongin-si (KR); Sunkwun Son, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/019,326

(22) Filed: Jan. 13, 2025

(65) Prior Publication Data

US 2025/0316229 A1 Oct. 9, 2025

(30) Foreign Application Priority Data

Apr. 5, 2024 (KR) ........................ 10-2024-0046425

(51) Int. Cl.
*G09G 3/3233* (2016.01)
*G06V 40/13* (2022.01)
(52) U.S. Cl.
CPC ....... *G09G 3/3233* (2013.01); *G06V 40/1318* (2022.01); *G09G 2320/0238* (2013.01); *G09G 2360/14* (2013.01)
(58) Field of Classification Search
CPC ......... G09G 3/3233; G09G 2320/0238; G09G 2360/14; G06V 40/1318
See application file for complete search history.

(56) References Cited

U.S. PATENT DOCUMENTS

| | | | |
|---|---|---|---|
| 11,276,743 B2 | 3/2022 | Cho et al. | |
| 11,543,904 B2 | 1/2023 | Bok et al. | |
| 2021/0200366 A1* | 7/2021 | Bok ...................... | G06V 10/17 |
| 2022/0028934 A1* | 1/2022 | Kim .................... | H10K 59/352 |
| 2022/0036826 A1* | 2/2022 | Cha ...................... | G09G 3/2003 |
| 2022/0317852 A1* | 10/2022 | Park ................... | G06V 40/1306 |
| 2022/0397934 A1* | 12/2022 | La .......................... | G06F 3/046 |

FOREIGN PATENT DOCUMENTS

| | | |
|---|---|---|
| KR | 10-2021-0086907 A | 7/2021 |
| KR | 10-2022-0014351 A | 2/2022 |

* cited by examiner

*Primary Examiner* — Premal R Patel
(74) *Attorney, Agent, or Firm* — Womble Bond Dickinson (US) LLP

(57) ABSTRACT

A display device includes a base layer on which a display area including and a non-display area are defined, a circuit layer on the base layer, and an element layer on the circuit layer and including a light emitting element on the display area, a first light sensing element, and a second light sensing element, wherein the circuit layer includes a pixel driving circuit connected to the light emitting element, a plurality of first reset control lines connected to the first sensor driving circuit, extending in a first direction, arranged in a second direction, and a plurality of second reset control lines connected to the second sensor driving circuit, extending in the first direction, arranged in the second direction, and the plurality of first reset control lines and the plurality of second reset control lines are electrically insulated from each other.

21 Claims, 20 Drawing Sheets

DISPLAY DEVICE

CROSS-REFERENCE TO RELATED APPLICATION

The present application claims priority to and the benefit of Korean Patent Application No. 10-2024-0046425, filed on Apr. 5, 2024, in the Korean Intellectual Property Office, the entire disclosure of which is incorporated herein by reference.

BACKGROUND

Aspects of some embodiments of the present disclosure described herein relate to a display device.

A display device provides various functions capable of visually communicating with a user, for example, by displaying images to provide information to the user or sensing input of the user. Recent display devices also include a function for sensing biometric information of the user.

Examples of a biometric information recognition methods may include a capacitance method of sensing a change in a capacitance formed between electrodes, an optical method of sensing an input light using an optical sensor, an ultrasonic method of sensing vibration using a piezoelectric material, and the like.

The above information disclosed in this Background section is only for enhancement of understanding of the background and therefore the information discussed in this Background section does not necessarily constitute prior art.

SUMMARY

Aspects of some embodiments of the present disclosure described herein relate to a display device, and for example, to a display device including a fingerprint sensing area and an illuminance sensing area.

Aspects of some embodiments of the present disclosure include a display device that may independently drive a fingerprint sensor and an illuminance sensor.

According to some embodiments of the present disclosure, a display device includes a base layer on which a display area including a fingerprint sensing area and an illuminance sensing area and a non-display area are defined, a circuit layer on the base layer, and an element layer on the circuit layer and including a light emitting element on the display area, a first light sensing element in the fingerprint sensing area, and a second light sensing element in the illuminance sensing area, wherein the circuit layer includes a pixel driving circuit connected to the light emitting element, a first sensor driving circuit connected to the first light sensing element, a second sensor driving circuit connected to the second light sensing element, a plurality of first reset control lines connected to the first sensor driving circuit, extending in a first direction, arranged in a second direction intersecting the first direction, and electrically connected to each other, and a plurality of second reset control lines connected to the second sensor driving circuit, extending in the first direction, arranged in the second direction, and electrically connected to each other, and the plurality of first reset control lines and the plurality of second reset control lines are electrically insulated from each other.

According to some embodiments, the plurality of first reset control lines may be electrically connected by at least one first vertical connection line extending in the second direction, and the plurality of second reset control lines may be electrically connected by at least one second vertical connection line extending in the second direction.

According to some embodiments, the illuminance sensing area may be closer to an edge of the display area than the fingerprint sensing area.

According to some embodiments, the first vertical connection line may be on a different layer from those of the plurality of first reset control lines.

According to some embodiments, the first vertical connection line may be at least one line selected from vertical lines connected to the first sensor driving circuit, extending in the second direction, and arranged in the first direction.

According to some embodiments, the first vertical connection line may be provided in plurality, and the plurality of first vertical connection lines may be arranged to be biased to one side of the fingerprint sensing area.

According to some embodiments, among the vertical lines, not-selected lines may be read-out lines electrically connected to a read-out circuit that reads out a fingerprint sensing signal.

According to some embodiments, the display device may further include a bridge line connecting the first vertical connection line and the plurality of first reset control lines in a plan view.

According to some embodiments, the bridge line may be on a different layer from those of the first vertical connection line and the plurality of first reset control lines.

According to some embodiments, the display device may further include a plurality of insulating layers on which a contact hole that electrically connects the first vertical connection line and the plurality of first reset control lines is defined.

According to some embodiments, the contact hole may be provided in plurality, the contact hole may include a first contact hole adjacent to one end of the bridge line in a plan view and passing through some of the plurality of insulating layers, and a second contact hole adjacent to the other end of the bridge line in the plan view and passing through the others of the plurality of insulating layers, and the one end of the bridge line may be electrically connected to the first vertical connection line by the first contact hole, and the other end of the bridge line may be electrically connected to the plurality of first reset control lines by the second contact hole.

According to some embodiments, the plurality of insulating layers may include a first insulating layer, a second insulating layer on the first insulating layer, and a third insulating layer on the second insulating layer, and the plurality of first reset control lines may be arranged on the first insulating layer, the first vertical connection line may be on the third insulating layer, and the bridge line may be on the second insulating layer.

According to some embodiments, the plurality of insulating layers may include a first insulating layer, a second insulating layer on the first insulating layer, a third insulating layer on the second insulating layer, and a fourth insulating layer on the third insulating layer, and the plurality of first reset control lines may be arranged on the first insulating layer, the first vertical connection line may be on the fourth insulating layer, and the bridge line may be on the second insulating layer or the third insulating layer.

According to some embodiments, the second vertical connection line may overlap the non-display area.

According to some embodiments, the second vertical connection line may be on the same layer as that of the plurality of second reset control lines.

According to some embodiments, each of the first sensor driving circuit and the second sensor driving circuit may include a reset transistor including a first electrode that receives a reset voltage, a second electrode connected to a first sensing node, and a third electrode that receives a reset control signal, an amplification transistor including a first electrode that receives a sensor driving voltage, a second electrode connected to the first sensing node, and a third electrode connected to a second sensing node, and an output transistor including a first electrode connected to the second sensing node, a second electrode connected to a corresponding read-out line, and a third electrode that receives an output control signal.

According to some embodiments, the plurality of first reset control lines may be connected to the third electrode of the reset transistor of the first sensor driving circuit, and the plurality of second reset control lines may be connected to the third electrode of the reset transistor of the second sensor driving circuit.

According to some embodiments of the present disclosure, a display device includes a display panel including a display area in which a light emitting element, a fingerprint sensing element, and an illuminance sensing element are arranged and a non-display area adjacent to the display area, wherein the display panel includes a pixel driving circuit connected to the light emitting element, a first sensor driving circuit connected to the fingerprint sensing element, a second sensor driving circuit connected to the illuminance sensing element, a plurality of first reset control lines connected to the first sensor driving circuit, extending in a first direction, and arranged in a second direction intersecting the first direction, and a plurality of second reset control lines connected to the second sensor driving circuit, extending in the first direction, and arranged in the second direction, the plurality of first reset control lines are electrically connected by at least one first vertical connection line extending in the second direction, and the plurality of second reset control lines are electrically connected by at least one second vertical connection line extending in the second direction.

According to some embodiments, the plurality of first reset control lines and the plurality of second reset control lines may be electrically insulated from each other.

According to some embodiments, the plurality of first reset control lines and the first vertical connection line may be arranged on different layers, and the plurality of second reset control lines and the second vertical connection line may be arranged on the same layer.

According to some embodiments of the present disclosure, an electronic device activated in response to electrical signals includes a display device folded or unfolded with respect to a folding axis extending in a first direction, an electronic module overlapping the display device and a housing accommodating the display device, wherein a display device includes a base layer on which a display area including a fingerprint sensing area and an illuminance sensing area and a non-display area are defined, a circuit layer on the base layer, and an element layer on the circuit layer and including a light emitting element on the display area, a first light sensing element in the fingerprint sensing area, and a second light sensing element in the illuminance sensing area, wherein the circuit layer includes a pixel driving circuit connected to the light emitting element, a first sensor driving circuit connected to the first light sensing element, a second sensor driving circuit connected to the second light sensing element, a plurality of first reset control lines connected to the first sensor driving circuit, extending in a first direction, arranged in a second direction intersecting the first direction, and electrically connected to each other, and a plurality of second reset control lines connected to the second sensor driving circuit, extending in the first direction, arranged in the second direction, and electrically connected to each other, and the plurality of first reset control lines and the plurality of second reset control lines are electrically insulated from each other.

BRIEF DESCRIPTION OF THE DRAWINGS

The above and other aspects and features of embodiments according to the present disclosure will become more apparent by describing in more detail aspects of some embodiments thereof with reference to the accompanying drawings.

DETAILED DESCRIPTION

Figure 1:
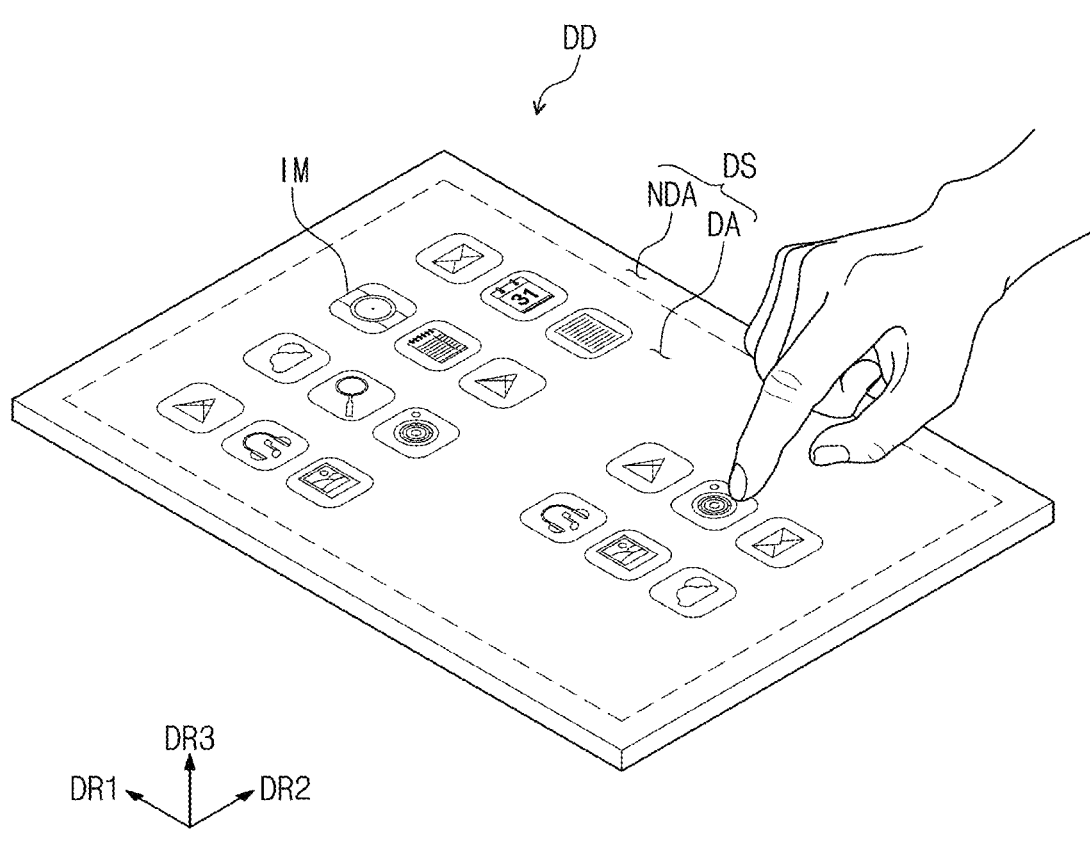
FIG. 1 is a perspective view of a display device according to some embodiments of the present disclosure.

In the specification, the expression that a first component (or area, layer, part, portion, etc.) is "located on", "connected with" or "coupled to" a second component means that the first component is directly located on/connected with/coupled to the second component or means that a third component is interposed therebetween.

The same reference numerals refer to the same components. Further, in the drawings, the thickness, the ratio, and the dimension of components are exaggerated for effective description of technical contents. The expression "and/or" includes one or more combinations which associated components are capable of defining.

Although the terms "first", "second", etc. may be used to describe various components, the components should not be limited by the terms. The terms are only used to distinguish one component from another component. For example, without departing from the right scope of the present disclosure, a first component may be referred to as a second component, and similarly, the second component may be also referred to as the first component. Singular expressions include plural expressions unless clearly otherwise indicated in the context.

Also, the terms "under", "below", "on", "above", etc. are used to describe the correlation of components illustrated in drawings. The terms that are relative in concept are described based on a direction illustrated in drawings.

It will be understood that the terms "include", "comprise", "have", etc. specify the presence of features, numbers, steps, operations, elements, or components, described in the specification, or a combination thereof, and do not exclude in advance the presence or additional possibility of one or more other features, numbers, steps, operations, elements, or components or a combination thereof.

Unless otherwise defined, all terms (including technical terms and scientific terms) used in the specification have the same meaning as commonly understood by those skilled in the art to which the present disclosure belongs. Furthermore, terms such as terms defined in the dictionaries commonly used should be interpreted as having a meaning consistent with the meaning in the context of the related technology and should not be interpreted in overly ideal or overly formal meanings unless explicitly defined herein.

Hereinafter, aspects of some embodiments of the present disclosure will be described in more detail with reference to the accompanying drawings.

FIG. 1 is a perspective view of a display device according to some embodiments of the present disclosure.

Referring to FIG. 1, a display device DD according to some embodiments of the present disclosure may have a rectangular shape having long sides extending in a first direction DR1 and short sides extending in a second direction DR2 intersecting the first direction DR1. However, embodiments according to the present disclosure are not limited thereto, and the display device DD may have various shapes such as a square shape, a circular shape, an elliptical shape, and polygonal shapes. Hereinafter, a direction perpendicular (or substantially perpendicular) to a plane defined by the first direction DR1 and the second direction DR2 is defined as a third direction DR3. In the specification, the phrases "when viewed on a plane" or "in a plan view" are defined as a state of being viewed from the third direction DR3.

An upper surface of the display device DD may be defined as a display surface DS and may have the plane defined by the first direction DR1 and the second direction DR2. Images IM generated by the display device DD may be provided to a user through the display surface DS.

The display surface DS may include a display area DA and a non-display area NDA around (e.g., in a periphery or outside a footprint of) the display area DA. The display area DA displays images, and the non-display area NDA does not display images. The non-display area NDA may surround the display area DA, but embodiments according to the present disclosure are not limited thereto, and the non-display area NDA may not be located on one side of the display area DA.

Figure 2:
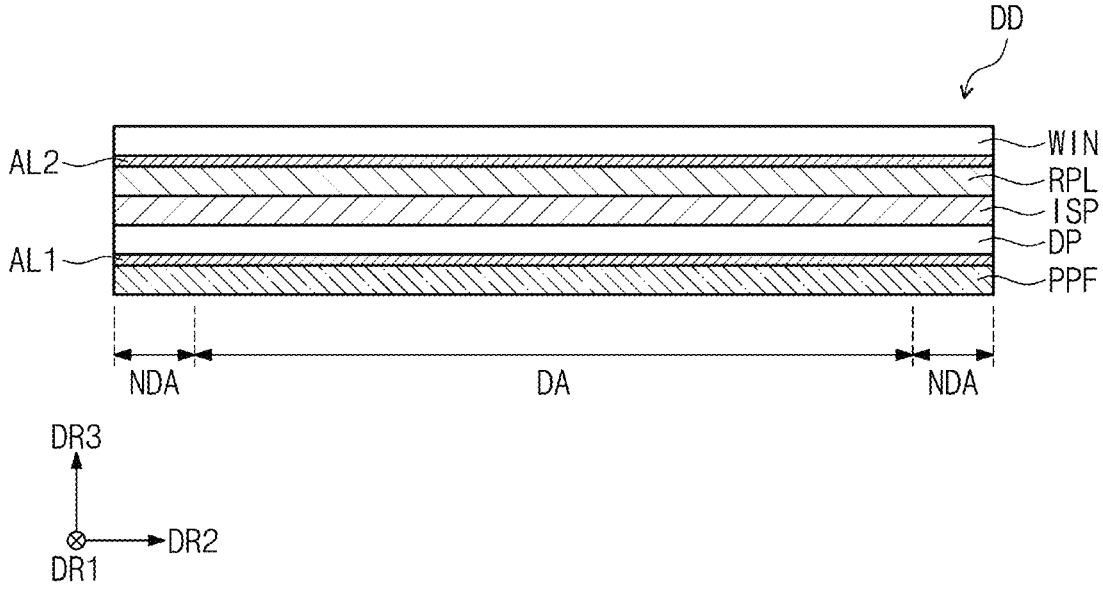
FIG. 2 is a cross-sectional view illustratively illustrating a cross section of the display device according to some embodiments of the present disclosure.

FIG. 2 is a cross-sectional view illustratively illustrating a cross section of the display device according to some embodiments of the present disclosure.

Referring to FIG. 2, the display device DD may include a display panel DP, an input sensor ISP, a reflection preventing layer RPL, a window WIN, a panel protecting film PPF, and first and second adhesive layers AL1 and AL2. According to some embodiments of the present disclosure, the input sensor ISP may be omitted.

The display panel DP according to some embodiments of the present disclosure may be a light emitting display panel, but embodiments according to the present disclosure are not particularly limited thereto. For example, the display panel DP may be an organic light emitting display panel or an inorganic light emitting display panel. A light emitting layer of the organic light emitting display panel may include an organic light emitting material. A light emitting layer of the inorganic light emitting display panel may include a quantum dot, a quantum rod, or the like. Hereinafter, the display panel DP is described as the organic light emitting display panel.

The input sensor ISP may be located on the display panel DP. The input sensor ISP may include a plurality of sensors for sensing an external input in a capacitive manner. The input sensor ISP may be directly formed on the display panel DP when the display device DD is manufactured. However, embodiments according to the present disclosure are not limited thereto, and the input sensor ISP may be manufactured as a separate panel from the display panel DP and attached to the display panel DP using an adhesive layer.

The reflection preventing layer RPL may be located on the input sensor ISP. The reflection preventing layer RPL may be directly formed on the input sensor ISP when the display device DD is manufactured. The reflection preventing layer RPL may include a color filter and may further include a black mattress.

However, embodiments according to the present disclosure are not limited thereto, and the reflection preventing layer RPL may be manufactured as a separate panel and attached to the input sensor ISP by an adhesive layer. The reflection preventing layer RPL may include an optical film such as a polarizing film. The reflection preventing layer RPL may reduce a reflectance of an external input input from an upper side of the display device DD toward the display panel DP. The external light may not be visually recognized by the user due to the reflection preventing layer RPL.

The window WIN may be located on the reflection preventing layer RPL. The window WIN may be adhered to an upper surface of the reflection preventing layer RPL by the second adhesive layer AL2. The window WIN may protect the display panel DP, the input sensor ISP, and the reflection preventing layer RPL from external scratches and impacts.

The panel protecting film PPF may be located under the display panel DP. The panel protecting film PPF may be adhered to a lower portion of the display panel DP by the first adhesive layer AL1. The panel protecting film PPF may protect the lower portion of the display panel DP. The panel protecting film PPF may include a flexible plastic material such as polyethyleneterephthalate (PET).

Figure 3:
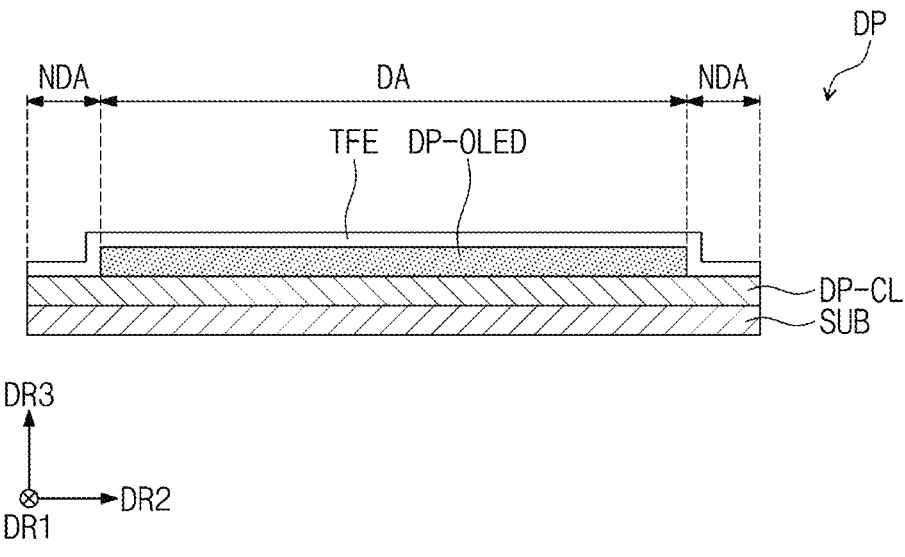
FIG. 3 is a cross-sectional view illustratively illustrating a cross section of a display panel according to some embodiments of the present disclosure.

FIG. 3 is a cross-sectional view illustratively illustrating a cross section of a display panel according to some embodiments of the present disclosure.

Referring to FIG. 3, the display panel DP may include a base layer SUB, a circuit element layer DP-CL located on the base layer SUB, a display element layer DP-OLED located on the circuit element layer DP-CL, and a thin film encapsulation layer TFE located on the display element layer DP-OLED.

The base layer SUB may include the display area DA and the non-display area NDA around the display area DA, which is like the display device DD of FIG. 1. The base layer SUB may include glass or a flexible plastic material such as polyimide (PI).

The circuit element layer DP-CL may include a driving circuit for a light emitting element and a driving circuit for a light sensing element. The display element layer DP-OLED may include the light emitting element and the light sensing element. The thin film encapsulation layer TFE may be located on the circuit element layer DP-CL to cover the display element layer DP-OLED. The thin film encapsulation layer TFE may protect the pixels from moisture, oxygen, and external foreign substances. The thin film encapsulation layer TFE may include an organic layer and an inorganic layer that are alternately laminated. The organic layer of the thin film encapsulation layer TFE may protect the display element layer DP-OLED from foreign substances. The inorganic layer of the thin film encapsulation layer TFE may protect the display element layer DP-OLED from contaminants such as moisture and oxygen.

Figure 4:
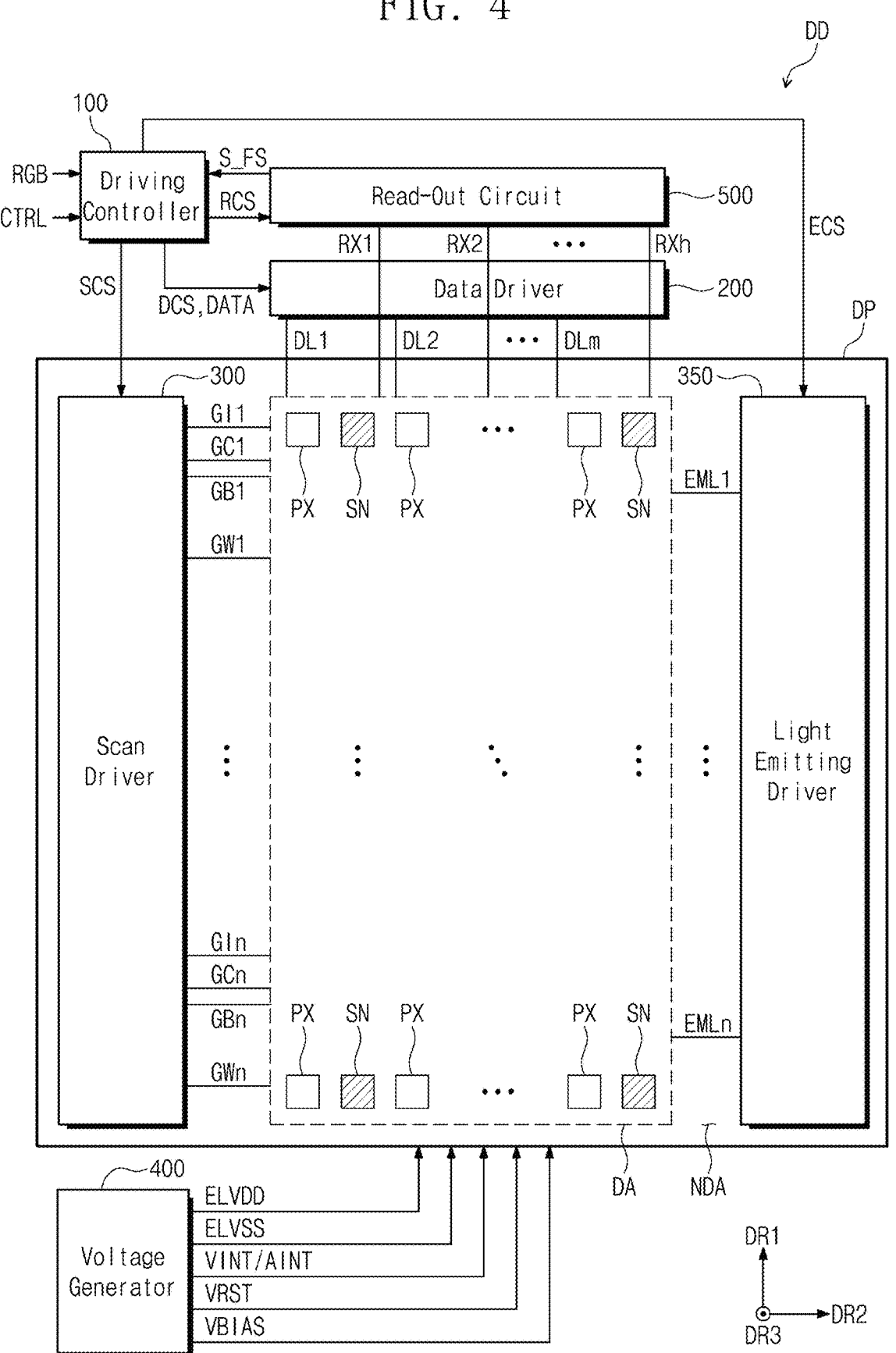
FIG. 4 is a block diagram of the display device according to some embodiments of the present disclosure.

FIG. 4 is a block diagram of the display device according to some embodiments of the present disclosure.

Referring to FIG. 4, the display device DD may include the display panel DP, a driving controller 100, and a driving circuit of the display device DD. As an example of the present disclosure, the driving circuit of the display device DD may include a data driver 200, a scan driver 300, a light emitting driver 350, a voltage generator 400, and a read-out circuit 500. According to some embodiments of the present disclosure, the voltage generator 400 and the read-out circuit 500 together with the driving controller 100 may be implemented as one driving chip.

The display panel DP may include a plurality of pixels PX located in the display area DA and a plurality of optical sensors SN located in the display area DA. As an example of the present disclosure, each of the plurality of optical sensors SN may be located between two pixels PX adjacent to each other. However, an arrangement relationship between the optical sensors SN and the pixels PX is not limited thereto.

The display panel DP may include initialization scan lines GI1 to GIn, compensation scan lines GC1 to GCn, bias scan lines GB1 to GBn, writing scan lines GW1 to GWn, light emitting control lines EML1 to EMLn, data lines DL1 to DLm, and read-out lines RX1 to RXh. The initialization scan lines GI1 to GIn, the compensation scan lines GC1 to GCn, the bias scan lines GB1 to GBn, the writing scan lines GW1 to GWn, and the light emitting control lines EML1 to EMLn may extend in the second direction DR2. The data lines DL1 to DLm and the read-out lines RX1 to RXh may extend in the first direction DR1.

The plurality of pixels PX are electrically connected to the initialization scan lines GI1 to GIn, the compensation scan lines GC1 to GCn, the writing scan lines GW1 to GWn, the bias scan lines GB1 to GBn, the light emitting control lines EML1 to EMLn, and the data lines DL1 to DLm. However, the number of signal lines connected to each of the pixels PX is not limited thereto and may be changed.

The plurality of optical sensors SN are electrically connected to the writing scan lines GW1 to GWn and the read-out lines RX1 to RXh. The number of signal lines connected to each of the plurality of optical sensors SN is not limited thereto and may be changed.

The driving controller 100 receives an image signal RGB and a control signal CTRL. The driving controller 100 generates an image data signal DATA obtained by converting a data format of the image signal RGB to meet an interface specification with the data driver 200. The driving controller 100 outputs a first control signal DCS, a second control signal SCS, a third control signal ECS, and a fourth control signal RCS.

The data driver 200 receives the first control signal DCS and the image data signal DATA from the driving controller 100. The data driver 200 converts the image data signal DATA into data signals and outputs the data signals to the plurality of data lines DL1 to DLm, which will be described below. The data signals are analog voltages corresponding to grayscale values of the image data signal DATA.

The scan driver 300 receives the second control signal SCS from the driving controller 100. The scan driver 300 outputs initialization scan signals to the initialization scan lines GI1 to GIn and outputs compensation scan signals to the compensation scan lines GC1 to GCn in response to the second control signal SCS. Further, the scan driver 300 may output writing scan signals to the writing scan lines GW1 to GWn and output black scan signals to the bias scan lines GB1 to GBn in response to the second control signal SCS.

The light emitting driver 350 receives the third control signal ECS from the driving controller 100. The light emitting driver 350 may output light emitting control signals to the light emitting control lines EML1 to EMLn in response to the third control signal ECS. Alternatively, the scan driver 300 may be connected to the light emitting control lines EML1 to EMLn. In this case, the light emitting driver 350 may be omitted, and the scan driver 300 may output the light emitting control signals to the light emitting control lines EML1 to EMLn.

The read-out circuit 500 may receive the fourth control signal RCS from the driving controller 100. The read-out circuit 500 may receive sensing signals from the read-out lines RX1 to RXh in response to the fourth control signal RCS. The read-out circuit 500 may process the sensing signals received from the read-out lines RX1 to RXh and provide the processed sensing signals S_FS to the driving controller 100. The driving controller 100 may recognize biometric information based on the sensing signals S_FS.

The voltage generator 400 generates voltages required for operating the display panel DP. According to some embodiments, the voltage generator 400 may generate a first driving voltage ELVDD, a second driving voltage ELVSS having a level lower than the first driving voltage ELVDD, a first initialization voltage VINT, a sensor driving voltage AINT, a reset voltage VRST, and a bias voltage VBIAS.

Figure 5:
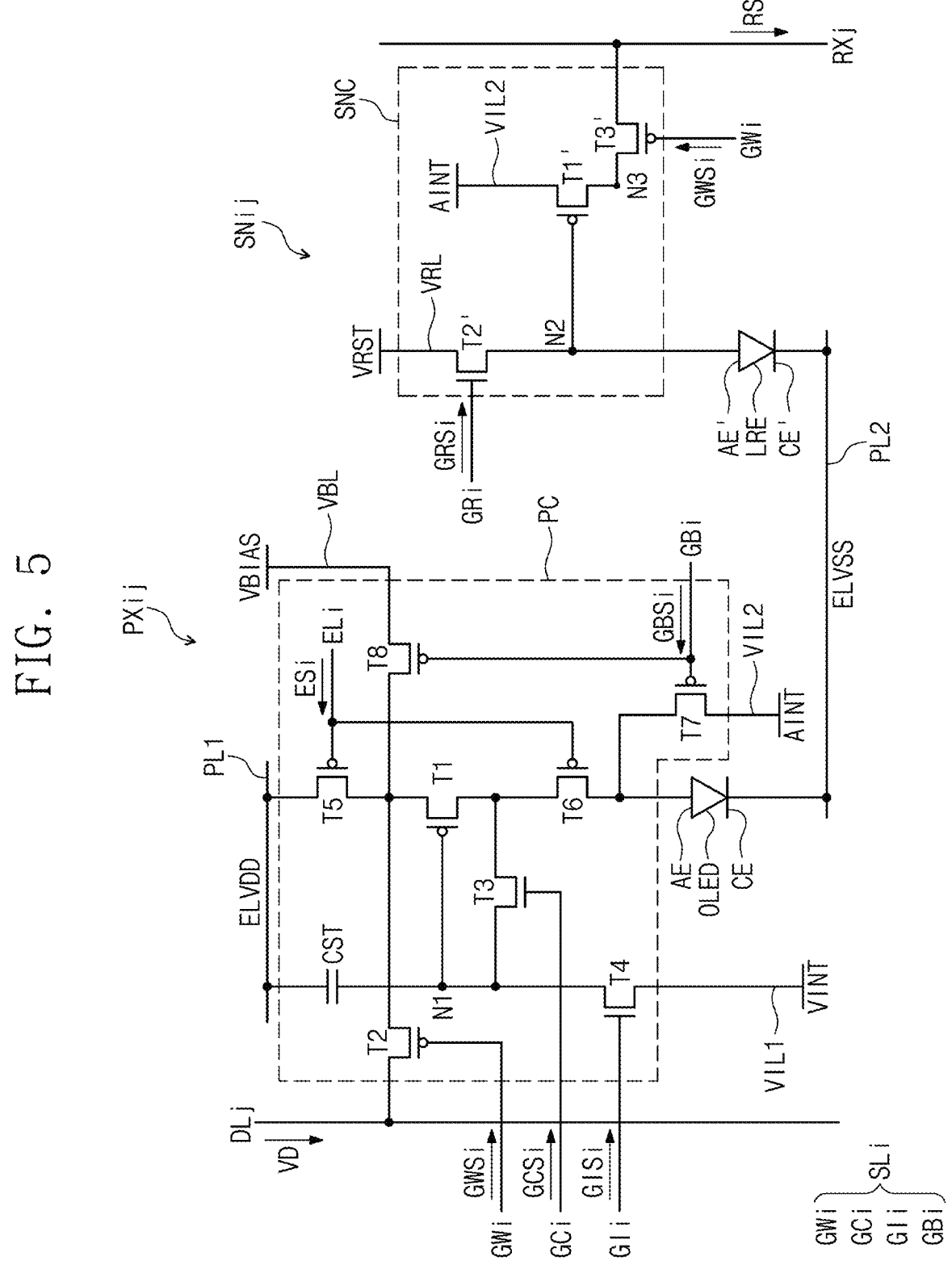
FIG. 5 is a view illustrating an equivalent circuit of a pixel and an optical sensor adjacent to the pixel according to some embodiments of the present disclosure.

FIG. 5 is a view illustrating an equivalent circuit of a pixel and an optical sensor adjacent to the pixel according to some embodiments of the present disclosure. Although FIG. 5 illustrates various components in a pixel and an optical sensor according to some embodiments, embodiments according to the present disclosure are not limited thereto, and according to various embodiments the pixel and the optical sensor may include additional components or fewer components without departing from the spirit and scope of embodiments according to the present disclosure.

Illustratively, FIG. 5 illustrates a pixel PXij connected to an $i^{th}$ scan lines SLi, an $i^{th}$ light emitting line ELi, and a $j^{th}$ data line DLj. Further, FIG. 5 illustratively illustrates an optical sensor SNij connected to an $i^{th}$ reset control line GRi and the $j^{th}$ read-out line RXj. "i" and "j" are natural numbers. The $i^{th}$ scan lines SLi may include the $i^{th}$ initialization scan line GIi, the $i^{th}$ compensation scan line GCi, the $i^{th}$ bias scan line GBi, and the $i^{th}$ writing scan line GWi.

Referring to FIG. 5, the pixel PXij may include a pixel driving circuit PC (or a first driving circuit) and a light emitting element OLED electrically connected to the pixel driving circuit PC. The light emitting element OLED may be turned on or off under control of the pixel driving circuit PC.

The pixel driving circuit PC may include a plurality of transistors T1 to T8 and a capacitor CST. The transistors T1 to T8 and the capacitor CST may control the amount of a current flowing through the light emitting element OLED. The light emitting element OLED may generate a light having a brightness (e.g., a set or predetermined brightness) according to the amount of provided current.

The $i^{th}$ writing scan line GWi may receive an $i^{th}$ writing scan signal GWSi, and the $i^{th}$ compensation scan line GCi may receive an $i^{th}$ compensation scan signal GCSi. The $i^{th}$ initialization scan line GIi may receive an $i^{th}$ initialization scan signal GISi, and the $i^{th}$ bias scan line GBi may receive an $i^{th}$ bias scan signal GBSi. The $i^{th}$ reset control line GRi may receive an $i^{th}$ reset control signal GRSi. The $i^{th}$ light emitting line ELi may receive an $i^{th}$ light emitting signal ESi.

A first initialization line VIL1 may receive the first initialization voltage VINT, and a second initialization line VIL2 may receive the sensor driving voltage AINT. A bias line VBL may receive the bias voltage VBIAS. A first power line PL1 may receive the first driving voltage ELVDD, and a second power line PL2 may receive the second driving voltage ELVSS. The light emitting element OLED may be connected to the second power line PL2. A reset line VRL may receive the reset voltage VRST.

Each of the transistors T1 to T8 may include a source (or a source terminal), a drain (or a drain terminal), and a gate (or a gate terminal). Hereinafter, in FIG. 5, for convenience, one of the source and the drain is defined as a first electrode, and the other thereof is defined as a second electrode. Further, the gate is defined as a gate electrode or a control electrode.

The transistors T1 to T8 may include the first to eighth transistors T1 to T8. The first, second, and fifth to eighth transistors T1, T2, and T5 to T8 may be p-type metal oxide semiconductor (PMOS) transistors. The third and fourth transistors T3 and T4 may be n-type metal oxide semiconductor (NMOS) transistors.

The first transistor T1 may be defined as a driving transistor, and the second transistor T2 may be defined as a switching transistor. The third transistor T3 may be defined as a compensation transistor. The fourth transistor T4 and the seventh transistor T7 may be defined as initialization transistors. The fifth transistor T5 and the sixth transistor T6 may be defined as light emitting control transistors. The eighth transistor T8 may be defined as a bias transistor.

The light emitting element OLED may include an organic light emitting diode. The light emitting element OLED may include a first electrode, a second electrode, and a light emitting layer located between the first electrode and the second electrode. According to some embodiments, for convenience of description, the first electrode is described as an anode AE, and the second electrode is described as a cathode CE. The anode AE may be electrically connected to the first power line PL1 through the sixth, first, and fifth transistors T6, T1, and T5. The cathode CE may be electrically connected to the second power line PL2.

The first transistor T1 may be located between the fifth transistor T5 and the sixth transistor T6 and connected to the fifth transistor T5 and the sixth transistor T6. The first transistor T1 may be connected to the first power line PL1 through the fifth transistor T5 and connected to the anode AE through the sixth transistor T6.

The first transistor T1 may include a first electrode connected to the first power line PL1 through the fifth transistor T5, a second electrode connected to the anode AE through the sixth transistor T6, and a gate electrode connected to a first node N1.

The first electrode of the first transistor T1 may be connected to the fifth transistor T5, and the second electrode of the first transistor T1 may be connected to the sixth transistor T6. The first transistor T1 may control the amount of current flowing through the light emitting element OLED according to a voltage of the first node N1 applied to the gate electrode of the first transistor T1.

The second transistor T2 may be located between the first transistor T1 and the $j^{th}$ data line DLj and connected to the first transistor T1 and the $j^{th}$ data line DLj. The second transistor T2 may include a first electrode connected to the $j^{th}$ data line DLj, a second electrode connected to the first electrode of the first transistor T1, and a gate electrode connected to the $i^{th}$ writing scan line GWi.

The second transistor T2 may be turned on by the $i^{th}$ writing scan signal GWSi applied through the $i^{th}$ writing scan line GWi and electrically connect the $j^{th}$ data line DLj and the first electrode of the first transistor T1. The second transistor T2 may perform a switching operation of providing a data voltage VD applied through the $j^{th}$ data line DLj to the first electrode of the first transistor T1.

The third transistor T3 may be connected to the second electrode of the first transistor T1 and the first node N1. The third transistor T3 may include a first electrode connected to the second electrode of the first transistor T1, a second electrode connected to the first node N1, and a gate electrode connected to the $i^{th}$ compensation scan line GCi.

The third transistor T3 may be turned on by the $i^{th}$ compensation scan signal GCSi applied through the $i^{th}$ compensation scan line GCi and electrically connect the second electrode of the first transistor T1 and the gate electrode of the first transistor T1. When the third transistor T3 is turned on, the first transistor T1 and the third transistor T3 may be diode-connected to each other.

The fourth transistor T4 may be connected to the first node N1. The fourth transistor T4 may include a first electrode connected to the first node N1, a second electrode connected to the first initialization line VIL1, and a gate electrode connected to the $i^{th}$ initialization scan line GIi. The fourth transistor T4 may be turned on by the $i^{th}$ initialization scan signal GISi applied through the $i^{th}$ initialization scan line GIi and provide the first initialization voltage VINT applied through the first initialization line VIL1 to the first node N1.

The fifth transistor T5 may include a first electrode connected to the first power line PL1, a second electrode connected to the first electrode of the first transistor T1, and a gate electrode connected to the $i^{th}$ light emitting line ELi. The sixth transistor T6 may include a first electrode connected to the second electrode of the first transistor T1, a second electrode connected to the anode AE, and a gate electrode connected to the $i^{th}$ light emitting line ELi.

The fifth transistor T5 and the sixth transistor T6 may be turned on by the $i^{th}$ light emitting signal ESi applied through the $i^{th}$ light emitting line ELi. The first driving voltage ELVDD is provided to the light emitting element OLED by the turned-on fifth transistor T5 and the turned-on sixth transistor T6, so that a driving current may flow in the light emitting element OLED. Thus, the light emitting element OLED may emit a light.

The seventh transistor T7 may include a first electrode connected to the anode AE, a second electrode connected to the second initialization line VIL2, and a gate electrode connected to the $i^{th}$ bias scan line GBi. The seventh transistor T7 may be turned on by the $i^{th}$ bias scan signal GBSi applied through the $i^{th}$ bias scan line GBi and provide the sensor driving voltage AINT received through the second initialization line VIL2 to the anode AE of the light emitting element OLED.

According to some embodiments of the present disclosure, the seventh transistor T7 may be omitted. According to some embodiments of the present disclosure, the sensor driving voltage AINT may have a different level from the first initialization voltage VINT, but embodiments according to the present disclosure are not limited thereto, and the sensor driving voltage AINT may have the same level as the first initialization voltage VINT.

The seventh transistor T7 may improve black expression capability of the pixel PXij. When the seventh transistor T7 is turned on, a parasitic capacitor of the light emitting element OLED may be discharged. Thus, when black brightness is implemented, the light emitting element OLED does not emit a light due to a leakage current of the first transistor T1, and accordingly, the black expression capability may be improved.

The capacitor CST may include a first electrode connected to the first power line PL1 and a second electrode connected to the first node N1. When the fifth transistor T5 and the sixth transistor T6 are turned on, the amount of current flowing through the first transistor T1 may be determined according to a voltage stored in the capacitor CST.

The eighth transistor T8 may include a first electrode connected to the bias line VBL, a second electrode connected to the first electrode of the first transistor T1, and a gate electrode connected to the $i^{th}$ bias scan line GBi. According to some embodiments of the present disclosure, the eighth transistor T8 may be omitted.

The eighth transistor T8 may be turned on by the $i^{th}$ bias scan signal GBSi and may provide the bias voltage VBIAS to the first electrode of the first transistor T1. As the bias voltage VBIAS is applied to the first transistor T1, movement of a hysteresis curve of the first transistor T1 may be suppressed.

The optical sensor SNij may include a sensor driving circuit SNC (or a second driving circuit) and a light sensing element LRE electrically connected to the sensor driving circuit SNC. The sensor driving circuit SNC may sense an operation of the light sensing element LRE.

The sensor driving circuit SNC may include a first sensing transistor T1' (or an amplification transistor), a second sensing transistor T2' (or a reset transistor), and a third sensing transistor T3' (or an output transistor). The first and third transistors T1' and T3' may be PMOS transistors, and the second sensing transistor T2' may be an NMOS transistor.

The light sensing element LRE may be defined as a photo diode. The light sensing element LRE may convert energy of a light input from the outside into electrical energy. The light sensing element LRE may include a first electrode, a second electrode, and a photoelectric converting layer located between the first electrode and the second electrode. According to some embodiments, for convenience of description, the first electrode is described as an anode AE', and the second electrode is described as a cathode CE'. The anode AE' may be connected to a second node N2, and the cathode CE' may be connected to the second power line PL2. Meanwhile, to distinguish the anode AE and the cathode CE of the light emitting element OLED form the anode AE' and the cathode CE' of the light sensing element LRE, the anode AE and the cathode CE of the light emitting element OLED may be defined as a first electrode and a second electrode, and the anode AE' and the cathode CE' of the light sensing element LRE may be defined as a $(1-1)^{th}$ electrode and a $(2-1)^{th}$ electrode.

The first sensing transistor T1' may be connected to the light sensing element LRE, the second sensing transistor T2', and the third sensing transistor T3'. The first sensing transistor T1' may include a first electrode that receives the sensor driving voltage AINT, a second electrode (or a gate electrode) connected to the second node N2 (or a first sensing node), and a third electrode connected to a third node N3 (or a second sensing node) and the third sensing transistor T3'. The first electrode of the first sensing transistor T1' may be connected to the second initialization line VIL2 to receive the sensor driving voltage AINT. The second sensing transistor T2' may include a first electrode connected to the reset line VRL to receive the reset voltage VRST, and a second electrode connected to the second node N2, and a third electrode (or a gate electrode) connected to the $i^{th}$ reset control line GRi to receive the $i^{th}$ reset control signal GRSi. The third sensing transistor T3' may include a first electrode connected to the second electrode of the first sensing transistor T1' and the third node N3, a second electrode connected to the read-out line RXj, and a third electrode (or a gate electrode) connected to the $i^{th}$ writing scan line GWi to receive the $i^{th}$ writing scan signal GWSi. The third sensing transistor T3' may be turned on by the $i^{th}$ writing scan signal GWSi received through the $i^{th}$ writing scan line GWi.

The second sensing transistor T2' may be turned on by the $i^{th}$ reset control signal GRSi received through the $i^{th}$ reset control line GRi. The turned-on second sensing transistor T2' may receive the reset voltage VRST and provide the reset voltage VRST to the second node N2. The second node N2 may be reset by the reset voltage VRST.

The $i^{th}$ writing scan signal GWSi may be applied to the gate electrode of the third sensing transistor T3' so that the third sensing transistor T3' is turned on. That is, the third sensing transistor T3' may receive the $i^{th}$ writing scan signal GWSi supplied from the $i^{th}$ writing scan line GWi as an output control signal. The first sensing transistor T1' may be connected to the read-out line RXj by the turned-on third sensing transistor T3'.

The light sensing element LRE may receive a light and convert the light into an electrical signal, and in this case, a voltage of the second node N2 may be changed. When the first sensing transistor T1' is turned on, the sensor driving voltage AINT provided to the first sensing transistor T1' may be controlled according to a change in the voltage of the second node N2 and provided to the read-out line RXj through the third sensing transistor T3'. Thus, a signal sensed by the light sensing element LRE may be output as a sensing signal RS through the read-out line RXj.

Figure 6:
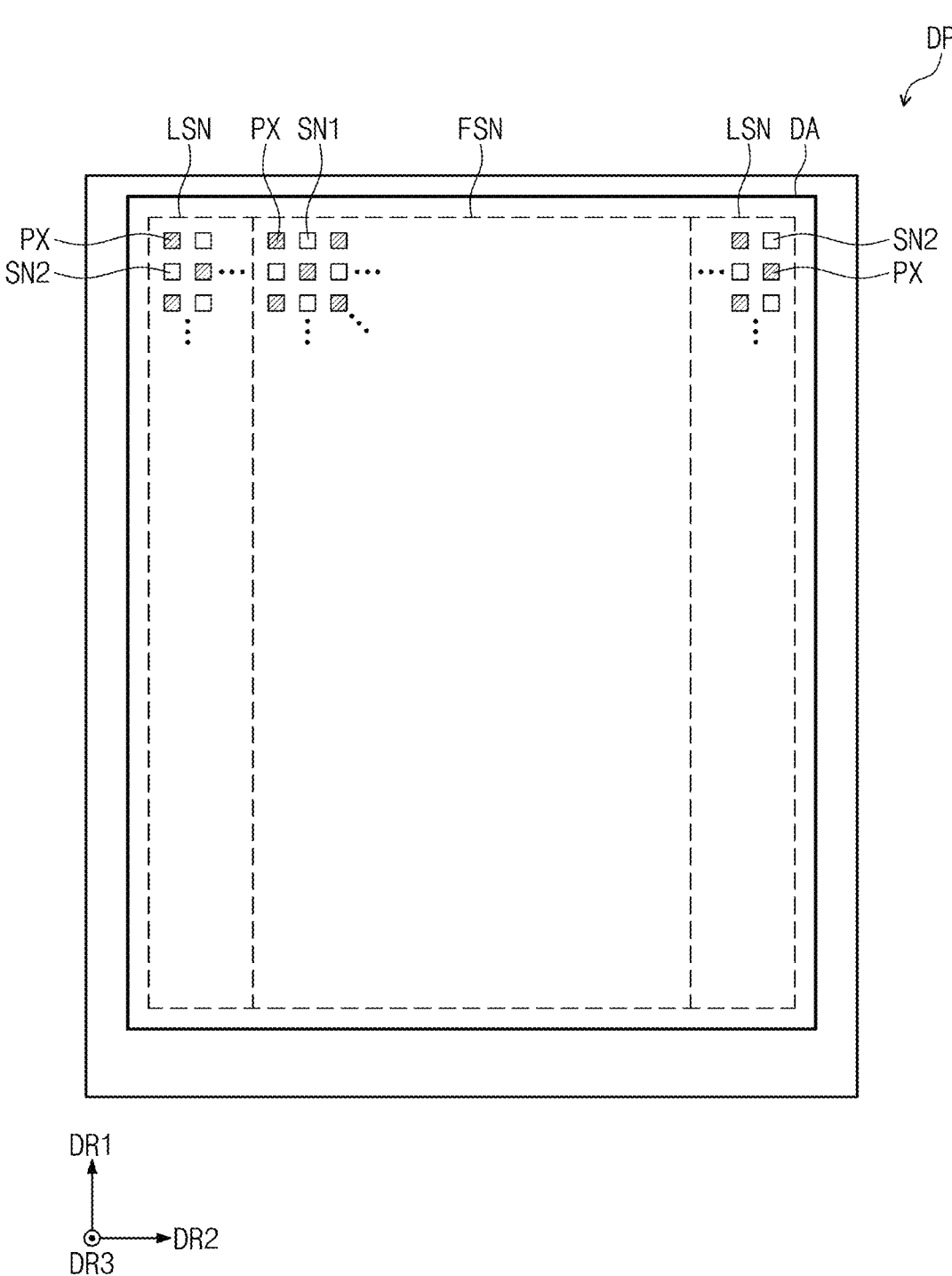
FIG. 6 is a plan view illustratively illustrating a plane of the display panel according to some embodiments of the present disclosure.

FIG. 6 is a plan view illustratively illustrating a plan view of the display panel according to some embodiments of the present disclosure.

Referring to FIG. 6, the display panel DP may include the display area DA and the non-display area NDA located adjacent to the display area DA. The non-display area NDA may surround (e.g., in a periphery or outside a footprint of) the display area DA. The pixel PX and optical sensors SN1 and SN2 may be arranged in the display area DA.

The display area DA may include a fingerprint sensing area FSN and an illuminance sensing area LSN. The illuminance sensing area LSN may be located closer to an edge of the display area DA than the fingerprint sensing area FSN. The fingerprint sensing area FSN is an area that recognizes a fingerprint of the user and thus may be arranged adjacent to a center of the display area DA to promote user convenience.

The illuminance sensing area LSN may be provided as a plurality of illuminance sensing areas LSN, and the illuminance sensing areas LSN may be arranged with the fingerprint sensing area FSN interposed therebetween in the second direction DR2. The illuminance sensing areas LSN may be arranged on a left side and a right side of the fingerprint sensing area FSN. However, the arrangement of the illuminance sensing area LSN and the fingerprint sensing area FSN is merely illustratively illustrated, and the arrangement of the illuminance sensing area LSN and the fingerprint sensing area FSN may be changed as needed. For example, the illuminance sensing areas LSN may be arranged on an upper side and a lower side of the fingerprint sensing area FSN. Alternatively, the illuminance sensing area LSN may be arranged to surround the fingerprint sensing area FSN.

The plurality of pixels PX and the plurality of first optical sensors SN1 (or fingerprint sensors) may be arranged in the fingerprint sensing area FSN. The plurality of pixels PX and the plurality of first optical sensors SN1 may be alternately arranged in the first direction DR1 and the second direction DR2. However, the arrangement of the pixels PX and the first optical sensors SN1 in FIG. 6 is illustratively illustrated, and the arrangement of the pixels PX and the first optical sensors SN1 is not limited thereto. For example, the two or more pixels PX may be arranged between the two first optical sensors SN1 that are adjacent to each other in the first direction DR1 among the plurality of first optical sensors SN1. The two or more pixels PX may be arranged between the two first optical sensors SN1 that are adjacent to each other in the second direction DR2 among the plurality of first optical sensors SN1.

The plurality of pixels PX and the plurality of second optical sensors SN2 (or illuminance sensors) may be arranged in the illuminance sensing area LSN. The plurality of pixels PX and the plurality of second optical sensors SN2 may be alternately arranged in the first direction DR1 and the second direction DR2. However, the arrangement of the pixels PX and the second optical sensors SN2 in FIG. 6 is illustratively illustrated, and the arrangement of the pixels PX and the second optical sensors SN2 is not limited thereto. For example, the two or more pixels PX may be arranged between the two second optical sensors SN2 that are adjacent to each other in the first direction DR1 among the plurality of second optical sensors SN2. The two or more pixels PX may be arranged between the two second optical sensors SN2 that are adjacent to each other in the second direction DR2 among the plurality of second optical sensors SN2.

Figure 7:
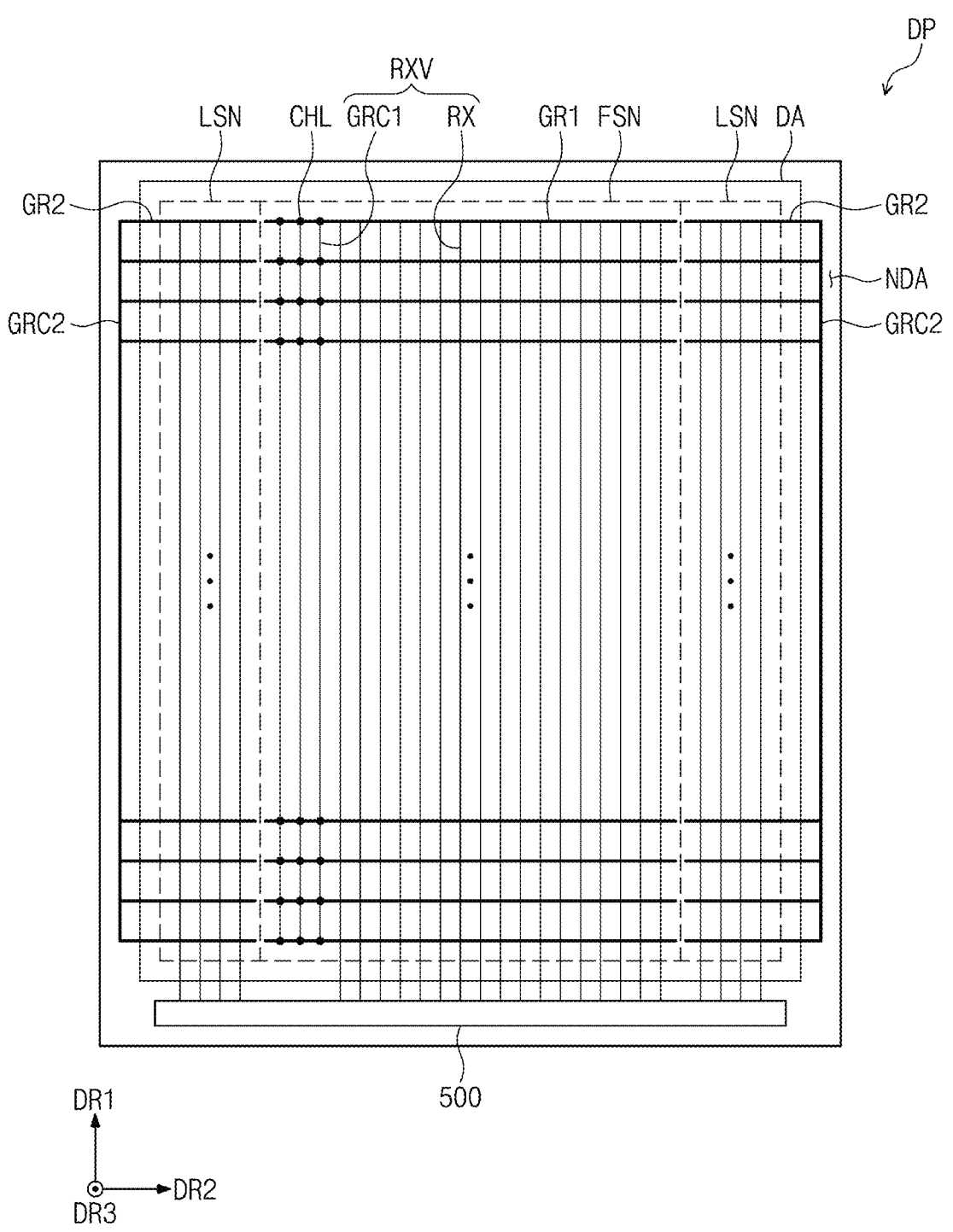
FIG. 7 is a plan view illustratively illustrating arrangement of reset lines, vertical connection lines, and read-out lines according to some embodiments of the present disclosure.

FIG. 7 is a plan view illustratively illustrating arrangement of reset lines, vertical connection lines, and read-out lines according to some embodiments of the present disclosure. However, for convenience of description, the scan lines and the data lines will be omitted.

Referring to FIG. 7, a first reset control line GR1 and vertical lines RXV may be arranged in the fingerprint sensing area FSN. The first reset control line GR1 may be provided as a plurality of first reset control lines GR1, and the plurality of first reset control lines GR1 may extend in the second direction DR2 and may be arranged in the first direction DR1. The first reset control lines GR1 may be connected to a first sensor driving circuit SNC1 (see FIG. 12), which will be described below.

The plurality of first reset control lines GR1 may be electrically connected to each other by a first vertical connection line GRC1. The plurality of first reset control lines GR1 may be electrically connected to the first vertical connection line GRC1 through a sensing contact hole CHL.

The vertical lines RXV may be provided as a plurality of vertical lines RXV and may include a plurality of read-out lines RX and at least one first vertical connection line GRC1. The vertical lines RXV may extend in the first direction DR1 and may be arranged in the second direction DR2. The vertical lines RXV may overlap the display area DA. The vertical lines RXV may be arranged across the fingerprint sensing area FSN and the illuminance sensing area LSN. The vertical lines RXV may be connected to the first sensor driving circuit SNC1 (see FIG. 12), which will be described below.

The read-out lines RX may be connected to the first sensor driving circuit SNC1 (see FIG. 12), may extend in the first direction DR1, and may be arranged in the second direction DR2. The read-out lines RX may be connected to the read-out circuit 500 that may read a fingerprint sensing signal. The read-out lines RX may correspond to the read-out line RXj (see FIG. 5) illustrated in FIG. 5.

The first vertical connection lines GRC1 may electrically connect the first reset control lines GR1 arranged in the first direction DR1. The first vertical connection lines GRC1 may be at least one line selected from the vertical lines RXV. That is, some of the vertical lines RXV may be utilized as the read-out lines RX, and the others thereof may be utilized as the first vertical connection lines GRC1.

The first vertical connection lines GRC1 may be arranged to be biased to one side of the fingerprint sensing area FSN. The read-out lines RX may not be arranged in an area in which the first vertical connection lines GRC1 are arranged. This is because the vertical lines RXV, which should be utilized as the read-out lines RX, are utilized as the first vertical connection lines GRC1. Accordingly, fingerprint sensing may be difficult in the corresponding area. Accordingly, the first vertical connection lines GRC1 may be arranged adjacent to an edge of the fingerprint sensing area FSN in which less fingerprint sensing is performed.

The first reset control lines GR1 and the first vertical connection lines GRC1 electrically connected to the first reset control lines GR1 may serve as the reset control line GRi (see FIG. 5) of the first optical sensor SN1.

A second reset control line GR2 and the read-out line RX may be arranged in the illuminance sensing area LSN. The second reset control line GR2 may be provided as a plurality of second reset control lines GR2, and the plurality of second reset control lines GR2 may extend in the second direction DR2 and may be arranged in the first direction DR1. The second reset control lines GR2 may be connected to a second sensor driving circuit SNC2 (see FIG. 11), which will be described below. The plurality of second reset control lines GR2 may be electrically connected to each other through a second vertical connection line GRC2. The second vertical connection line GRC2 may overlap the non-display area NDA.

The second reset control lines GR2 and the second vertical connection line GRC2 electrically connected to the second reset control lines GR2 may serve as the reset control line GRi (see FIG. 5) of the second optical sensor SN2. The second reset control lines GR2 and the second vertical connection line GRC2 may be arranged on the same layer and formed through the same process.

The plurality of first reset control lines GR1 and the plurality of second reset control lines GR2 may be electrically insulated from each other. The plurality of first reset control lines GR1 may overlap the fingerprint sensing area FSN, and the plurality of second reset control lines GR2 may overlap the illuminance sensing area LSN. The first reset control lines GR1 and the second reset control lines GR2 may not be connected at a boundary between the fingerprint sensing area FSN and the illuminance sensing area LSN and may be spaced apart from each other. In this way, the first reset control lines GR1 and the second reset control lines GR2 may be electrically insulated, and thus the mutually independent $i^{th}$ reset control signals GRSi (see FIG. 5) may be applied.

The first optical sensor SN1 (see FIG. 6) is a fingerprint sensor and measures a light reflected by the fingerprint among a light emitted from a panel, and thus the amount of light of a measurement target is low. Accordingly, a time from a time point at which the second node N2 (see FIG. 5) is reset by the $i^{th}$ reset control signal GRSi (see FIG. 5) to a time point at which output is performed by the read-out line RXj (see FIG. 5), should be long.

On the other hand, the second optical sensor SN2 (see FIG. 6), which is an illuminance sensor, measures an external light, and thus the amount of light of the measurement target is high. Accordingly, a time from a time point at which the second node N2 (see FIG. 5) is reset by the $i^{th}$ reset control signal GRSi (see FIG. 5) to a time point at which output is performed by the read-out line RXj (see FIG. 5), should be short. Thus, the first reset control lines GR1 and the second reset control lines GR2 may be electrically insulated, and thus it may be desirable to apply the mutually independent $i^{th}$ reset control signals GRSi (see FIG. 5).

Figure 8:
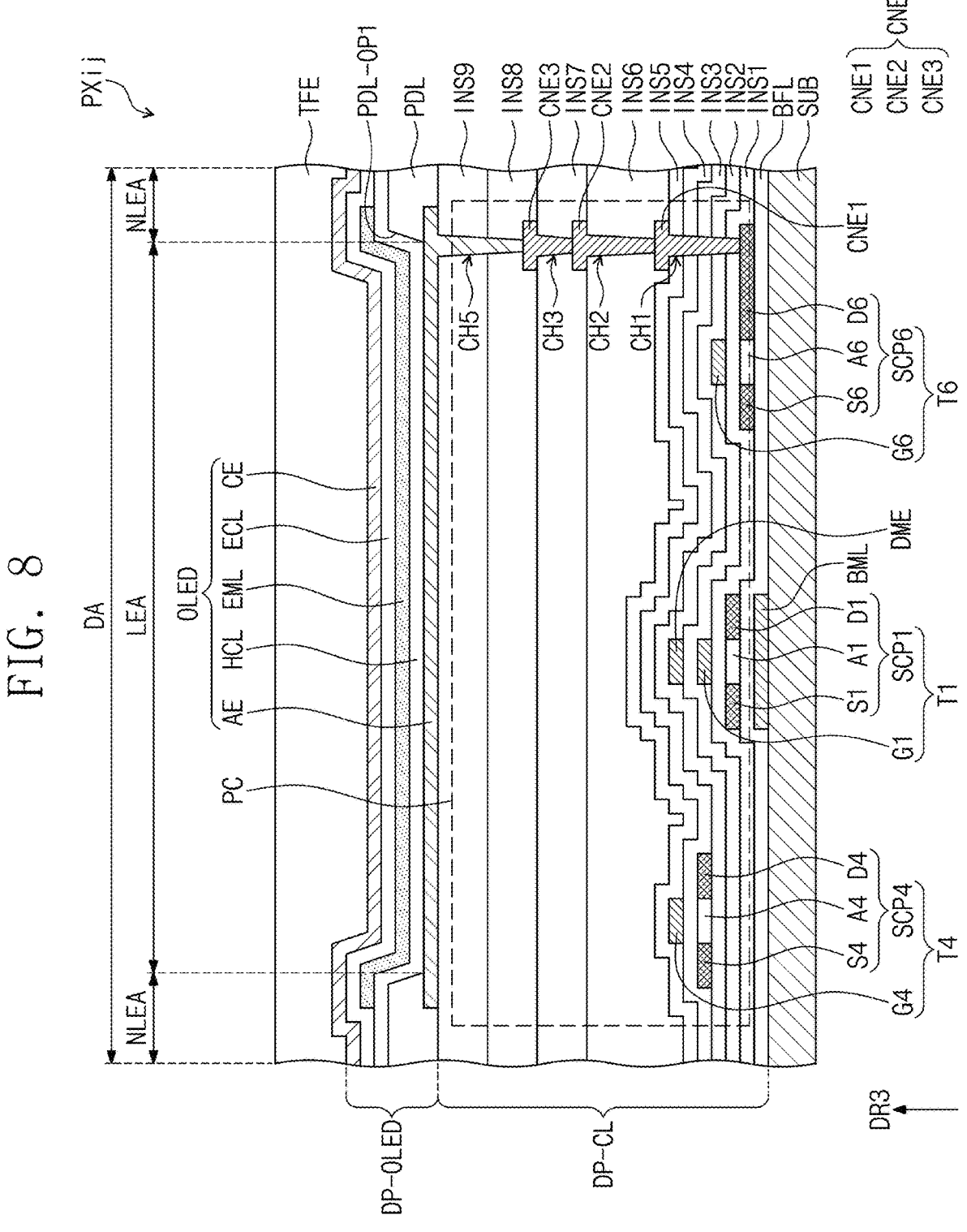
FIG. 8 is a cross-sectional view illustratively illustrating a cross section of the pixel according to some embodiments of the present disclosure.

FIG. 8 is a cross-sectional view illustratively illustrating a cross section of the pixel according to some embodiments of the present disclosure. In more detail, FIG. 8 is a view illustratively illustrating a cross section of the light emitting element OLED, the first transistor T1, the fourth transistor T4, and the sixth transistor T6 of the pixel PXij illustrated in FIG. 5.

FIG. 8 illustrates the first, fourth, and sixth transistors T1, T4, and T6 of the pixel driving circuit PC of FIG. 5. The pixel driving circuit PC may include the first, fourth, and sixth transistors T1, T4, and T6 and a connection electrode CNE. Referring to FIG. 8, a shielding layer BML may be located on the base layer SUB. Like the display panel DP (see FIG. 6), the display area DA (see FIG. 6) including the fingerprint sensing area FSN (see FIG. 6) and the illuminance sensing area LSN (see FIG. 6) and the non-display area NDA (see FIG. 6) may be defined in the base layer SUB. The shielding layer BML may overlap the first transistor T1. The shielding layer BML may include a metal and receive a constant voltage. When the constant voltage is applied to the shielding layer BML, a threshold voltage Vth of the first transistor T1 located on the shielding layer BML may be maintained without changing.

Further, the shielding layer BML may shield a light input to the first transistor T1 from a lower side of the shielding layer BML. For example, the shielding layer BML may include a reflective metal. According to some embodiments of the present disclosure, the shielding layer BML may be omitted.

A buffer layer BFL may be located on the base layer SUB, and the buffer layer BFL may include an inorganic layer. The buffer layer BFL may cover the shielding layer BML. A semiconductor layer SCP1 (or a semiconductor pattern area and hereinafter, described as a first semiconductor layer) of the first transistor T1 and a semiconductor layer SCP6 (or a semiconductor pattern area and hereinafter, described as a sixth semiconductor layer) of the sixth transistor T6 may be arranged on the buffer layer BFL. Hereinafter, the first and sixth semiconductor layers SCP1 and SCP6 may include polysilicon. However, embodiments according to the present disclosure are not limited thereto, and the first and sixth semiconductor layers SCP1 and SCP6 may include amorphous silicon.

The first and sixth semiconductor layers SCP1 and SCP6 may be formed through the same process, and partial areas of each of the first and sixth semiconductor layers SCP1 and SCP6 may be doped with an N-type dopant or a P-type dopant. The first and sixth semiconductor layers SCP1 and SCP6 may include a high-doped area and a low-doped area. A conductivity of the high-doped area is greater than a conductivity of the low-doped area. The high-doped areas may correspond (or substantially correspond) to source areas and drain areas of the first and sixth transistors T1 and T6. The low-doped areas may correspond (or substantially correspond) to active areas (or channels) of the first and sixth transistors T1 and T6.

The high-doped area of the first semiconductor layer SCP1 may include a first source area S1 and a first drain area D1. The low-doped area of the first semiconductor layer SCP1 is defined as a first channel area A1 and is located between the first source area S1 and the first drain area D1. The sixth semiconductor layer SCP6 may include a sixth source area S6, a sixth channel area A6, and a sixth drain area D6.

On a cross section of FIG. 8, the first semiconductor layer SCP1 and the sixth semiconductor layer SCP6 may be spaced apart from each other. However, on a plane, the first semiconductor layer SCP1 and the sixth semiconductor layer SCP6 may have an integrated shape. In other words, the first semiconductor layer SCP1 and the sixth semiconductor layer SCP6 may be different parts or different areas of one semiconductor pattern.

A first insulating layer INS1 that covers the first and sixth semiconductor layers SCP1 and SCP6 may be located on the buffer layer BFL. Gate electrodes of the first and sixth transistors T1 and T6 are arranged on the first insulating layer INS1. The gate electrodes of the first and sixth transistors T1 and T6 may be formed through the same process. Hereinafter, the gate electrode of the first transistor T1 is defined as a first gate electrode G1, and the gate electrode of the sixth transistor T6 is defined as a sixth gate electrode G6.

A second insulating layer INS2 may be located on the first insulating layer INS1 to cover the first and sixth gate electrodes G1 and G6. A dummy electrode DME may be located on the second insulating layer INS2. The dummy electrode DME may be located on the first gate electrode G1 and may overlap the first gate electrode G1 when viewed on a plane. The dummy electrode DME may form the capacitor CST together with the first gate electrode G1. In other words, the first gate electrode G1 corresponds to one electrode of the capacitor CST, and the dummy electrode DME corresponds to the other one electrode of the capacitor CST.

A third insulating layer INS3 may be located on the second insulating layer INS2 to cover the dummy electrode DME. A semiconductor layer SCP4 (or a semiconductor pattern area and hereinafter, described as a fourth semiconductor layer) of the fourth transistor T4 may be located on the third insulating layer INS3. The fourth semiconductor layer SCP4 may include an oxide semiconductor including a metal oxide. The oxide semiconductor may include a crystalline or amorphous oxide semiconductor.

The fourth semiconductor layer SCP4 may include a plurality of areas that are classified according to whether the metal oxide is reduced. An area (hereinafter, referred to as a reduced area) in which the metal oxide is reduced has conductivity higher than that of an area (hereinafter, a non-reduced area) in which the metal oxide is not reduced. The reduced areas may correspond (or substantially correspond) to a source area and a drain area of the fourth transistor T4. The non-reduced area may correspond (or substantially correspond) to an active area (or a channel) of the fourth transistor T4.

The reduced areas of the fourth semiconductor layer SCP4 may include a fourth source area S4 and a fourth drain area D4. A fourth channel area A4 may be located between the fourth source area S4 and the fourth drain area D4.

A fourth insulating layer INS4 may be located on the third insulating layer INS3 to cover the fourth semiconductor layer SCP4. A fourth gate electrode G4 of the fourth transistor T4 may be located on the fourth insulating layer INS4.

A fifth insulating layer INS5 may be located on the fourth insulating layer INS4 to cover the fourth gate electrode G4. The buffer layer BFL and the first to fifth insulating layers INS1 to INS5 may include inorganic layers.

The connection electrode CNE may be located between the sixth transistor T6 and the light emitting element OLED. The connection electrode CNE may electrically connect the sixth transistor T6 and the light emitting element OLED. The connection electrode CNE may include a first connection electrode CNE1, a second connection electrode CNE2 located on the first connection electrode CNE1, and a third connection electrode CNE3 located on the second connection electrode CNE2.

The first connection electrode CNE1 may be located on the fifth insulating layer INS5 and may be connected to the sixth drain area D6 through a first contact hole CH1 defined by the first to fifth insulating layers INS1 to INS5. A sixth insulating layer INS6 may be located on the fifth insulating layer INS5 to cover the first connection electrode CNE1.

The second connection electrode CNE2 may be located on the sixth insulating layer INS6. The second connection electrode CNE2 may be connected to the first connection electrode CNE1 through a second contact hole CH2 defined by the sixth insulating layer INS6. A seventh insulating layer INS7 may be located on the sixth insulating layer INS6 to cover the second connection electrode CNE2.

The third connection electrode CNE3 may be located on the seventh insulating layer INS7. The third connection electrode CNE3 may be connected to the second connection electrode CNE2 through a third contact hole CH3 defined by the seventh insulating layer INS7.

An eighth insulating layer INS8 may be located on the seventh insulating layer INS7 to cover the third connection electrode CNE3. A ninth insulating layer INS9 may be located on the eighth insulating layer INS8. The sixth to ninth insulating layers INS6 to INS9 may include inorganic layers or organic layers. According to some embodiments, each of the sixth to ninth insulating layers INS6 to INS9 may include an organic layer.

The light emitting element OLED is located on the ninth insulating layer INS9. The light emitting element OLED may include a first electrode AE, a second electrode CE, a hole control layer HCL, an electron control layer ECL, and a light emitting layer EML. The first electrode AE may be the anode AE illustrated in FIG. 5, and the second electrode CE may be the cathode CE illustrated in FIG. 5. The second electrode CE may be located on the first electrode AE, the hole control layer HCL and the electron control layer ECL may be arranged between the first electrode AE and the second electrode CE, and the light emitting layer EML may be located between the hole control layer HCL and the electron control layer ECL.

The display area DA may include a light emitting area LEA corresponding to the light emitting element OLED and a non-light emitting area NLEA adjacent to the light emitting area LEA. The first electrode AE may be located on the ninth insulating layer INS9. The first electrode AE may be electrically connected to the third connection electrode CNE3 through a fifth contact hole CH5 defined by the eighth insulating layer INS8 and the ninth insulating layer INS9.

A pixel defining film PDL, through which a portion (e.g., a set or predetermined portion) of the first electrode AE is exposed, may be located on the first electrode AE and the ninth insulating layer INS9. A first opening PDL-OP1, through which the portion (e.g., the set or predetermined portion) of the first electrode AE is exposed, may be defined in the pixel defining film PDL. The light emitting area LEA corresponds to the first opening PDL-OP1.

The hole control layer HCL may be located on the first electrode AE and the pixel defining film PDL. The hole control layer HCL may be commonly located in the light emitting area LEA and the non-light emitting area NLEA. The hole control layer HCL may include a hole transport layer and a hole injection layer.

The light emitting layer EML may be located on the hole control layer HCL. The light emitting layer EML may be located in an area corresponding to the first opening PDL-OP1. The light emitting layer EML may include an organic material and/or an inorganic material. The light emitting layer EML may generate a light having any one of red, green, and blue.

The electron control layer ECL may be located on the light emitting layer EML and the hole control layer HCL. The electron control layer ECL may be commonly located in the light emitting area LEA and the non-light emitting area NLEA. The electron control layer ECL may include an electron transport layer and an electron injection layer.

The second electrode CE may be located on the electron control layer ECL. The second electrode CE may be commonly located in the pixels PX. That is, the second electrode CE may be commonly arranged on the light emitting layers EML of the pixels PX.

Layers from the buffer layer BFL to the ninth insulating layer INS9 may be defined as the circuit element layer DP-CL. A layer, on which the light emitting element OLED is located, may be defined as the display element layer DP-OLED.

The thin film encapsulation layer TFE may be located on the light emitting element OLED. The thin film encapsulation layer TFE may include an inorganic layer, an organic layer, and an inorganic layer that are sequentially laminated. The inorganic layers may include inorganic materials and may protect the pixels from moisture/oxygen. The organic layer may include an organic material and protect the pixels PX from foreign substances such as dust particles.

Figure 9A:
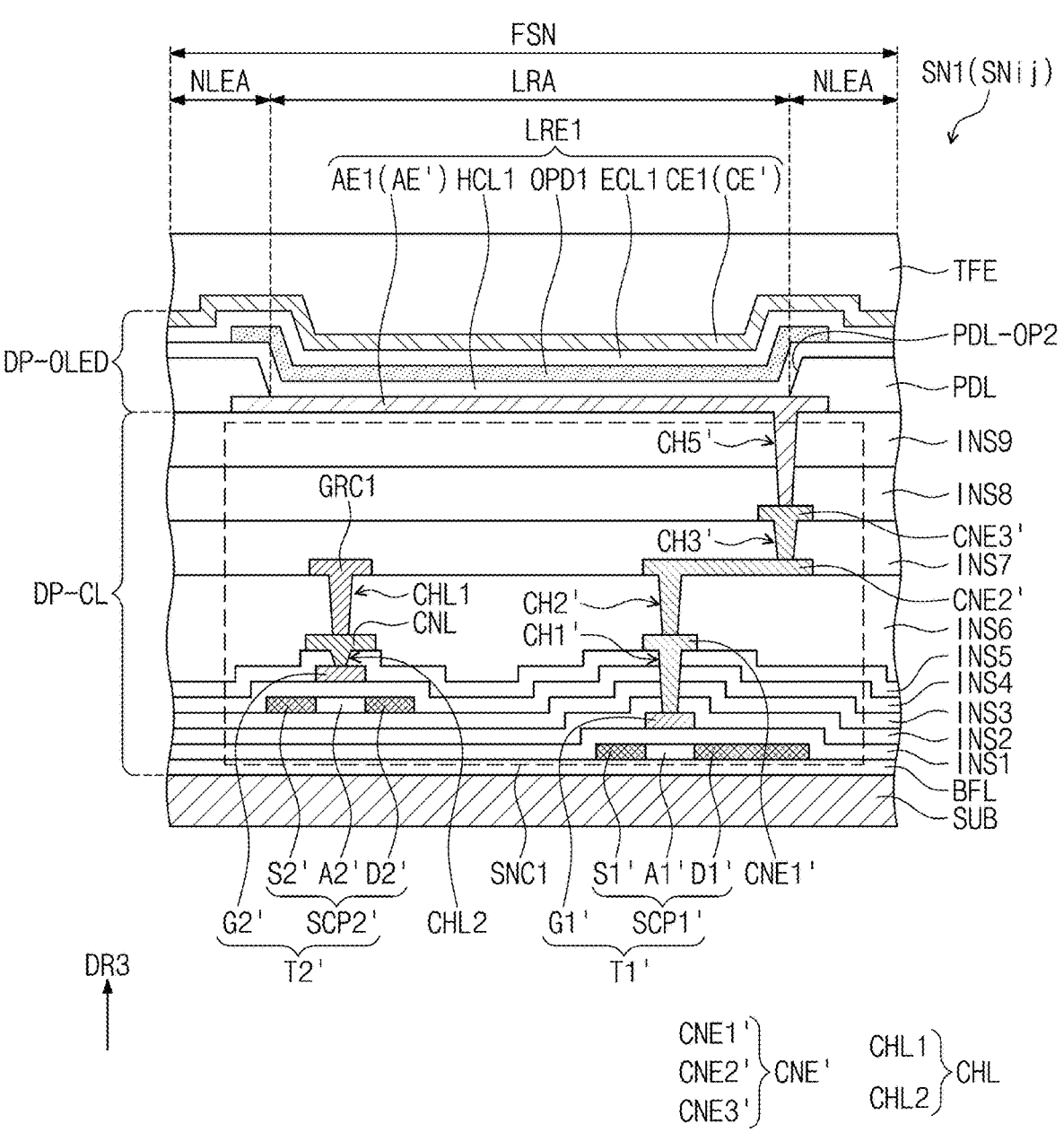
FIGS. 9A to 9B are cross-sectional views illustratively illustrating a cross section of a first optical sensor according to some embodiments of the present disclosure.

FIG. 9A is a cross-sectional view illustratively illustrating a cross section of a first optical sensor according to some embodiments of the present disclosure. In more detail, FIG. 9A illustratively illustrates a cross section of a first light sensing element LRE1 (or a fingerprint sensing element) of the first optical sensor SN1 and the first sensor driving circuit SNC1 connected to the first light sensing element LRE1. The first optical sensor SN1 illustrated in FIG. 9 may be the first optical sensor SN1 located at a position corresponding to a portion in which the sensing contact hole CHL (see FIG. 7) is located in FIG. 7. Hereinafter, a detailed description of the same configuration as that described in FIG. 8 refers to the description of FIG. 8.

A semiconductor layer SCP1' (hereinafter, referred to as a first sensing semiconductor layer) of the first sensing transistor T1' may be formed through the same process as the first semiconductor layer SCP1 of FIG. 8, and a semiconductor layer SCP2' (hereinafter, referred to as a second sensing semiconductor layer) of the second sensing transistor T2' may be formed through the same process as the fourth semiconductor layer SCP4 of FIG. 8. The first sensing semiconductor layer SCP1' may include a first source area S1', a first drain area D1', and a first channel area A1'. The second sensing semiconductor layer SCP2' may include a second source area S2', a second drain area D2', and a second channel area A2'.

The laminated structure of the first sensing transistor T1' may be the same (or substantially the same) as the laminated structure of the first transistor T1 illustrated in FIG. 8. The laminated structure of the second sensing transistor T2' may be the same (or substantially the same) as the laminated structure of the fourth transistor T4 illustrated in FIG. 8. According to some embodiments, the laminated structure of the third sensing transistor T3' may be the same (or substantially the same) as the laminated structure of the first sensing transistor T1'.

A connection electrode CNE' may include a first connection electrode CNE1' (or a first sensing connection electrode), a second connection electrode CNE2' (or a second sensing connection electrode), and a third connection electrode CNE3' (or a third sensing connection electrode). The first connection electrode CNE1' may be located on the same layer as that of the first connection electrode CNE1 illustrated in FIG. 8 and may be connected to a first gate electrode G1' of the first sensing transistor T1' through a first contact hole CH1'. Hereinafter, the first gate electrode G1' is defined as a first sensing gate electrode G1' to distinguish the first gate electrode G1' from the first gate electrode G1.

The second connection electrode CNE2' may be located on the same layer as that of the second connection electrode CNE2 illustrated in FIG. 8 and may be connected to the first connection electrode CNE1' through a second contact hole CH2' defined in the sixth insulating layer INS6. The third connection electrode CNE3' may be located on the same layer as that of the third connection electrode CNE3 illustrated in FIG. 8 and may be connected to the second connection electrode CNE2' through a third contact hole CH3'. A first electrode AE1 may be connected to the third connection electrode CNE3' through a fifth contact hole CH5' defined by the eighth insulating layer INS8 and the ninth insulating layer INS9.

A bridge line CNL may be located on the fifth insulating layer INS5. The bridge line CNL may be connected to a second gate electrode G2' of the second sensing transistor T2' through a second sensing contact hole CHL2 passing through the fifth insulating layer INS5. Hereinafter, the second gate electrode G2' is defined as a second sensing gate electrode G2' to distinguish the second gate electrode G2' from the second gate electrode G2.

The first vertical connection line GRC1 may be located on the sixth insulating layer INS6. The first vertical connection line GRC1 may be located on the same layer as that of the second connection electrode CNE2' and may be formed through the same process. The first vertical connection line GRC1 may be connected to the bridge line CNL through a first sensing contact hole CHL1 passing through the sixth insulating layer INS6. Accordingly, the first vertical connection line GRC1 may be connected to the second sensing gate electrode G2' of the second sensing transistor T2' through the first and second sensing contact holes CHL1 and CHL2. According to some embodiments, the bridge line CNL may be omitted. That is, the first vertical connection line GRC1 may be connected to the second sensing gate electrode G2' through the first and second sensing contact holes CHL1 and CHL2 passing through the fifth and sixth insulating layers INS5 and INS6.

Referring to FIG. 9A, the fingerprint sensing area FSN may include a light receiving area LRA corresponding to the optical sensor SNij and the non-light emitting area NLEA adjacent to the light receiving area LRA.

The first light sensing element LRE1 may include the first electrode AE1, a second electrode CE1, a hole control layer HCL1, an electron control layer ECL1, and a photoelectric conversion layer OPD1. The first light sensing element LRE1 may be located in the fingerprint sensing area FSN. The first electrode AE1 may be the anode AE' illustrated in FIG. 5, and the second electrode CE1 may be the cathode CE' illustrated in FIG. 5. A second opening PDL-OP2, through which a portion (e.g., a set or predetermined portion) of the first electrode AE1 is exposed, may be defined in the pixel defining film PDL. The light receiving area LRA corresponds to the second opening PDL-OP2.

The first electrode AE1 is formed through the same process as the first electrode AE illustrated in FIG. 8. The second electrode CE1, the hole control layer HCL1, and the electron control layer ECL1 may be integrally formed with the second electrode CE, the hole control layer HCL, and the electron control layer ECL illustrated in FIG. 8. The second electrode CE1 of FIG. 9A and the second electrode CE of FIG. 8 may be different areas of a common electrode. The common electrode may be deposited to have an integral shape through an open mask. The hole control layer HCL1 in FIG. 9A and the hole control layer HCL in FIG. 8 may also be different areas of a common hole control layer, and the electron control layer ECL1 in FIG. 9A and the electron control layer ECL1 in FIG. 8 may also be different areas of a common electron control layer.

Figure 9B:
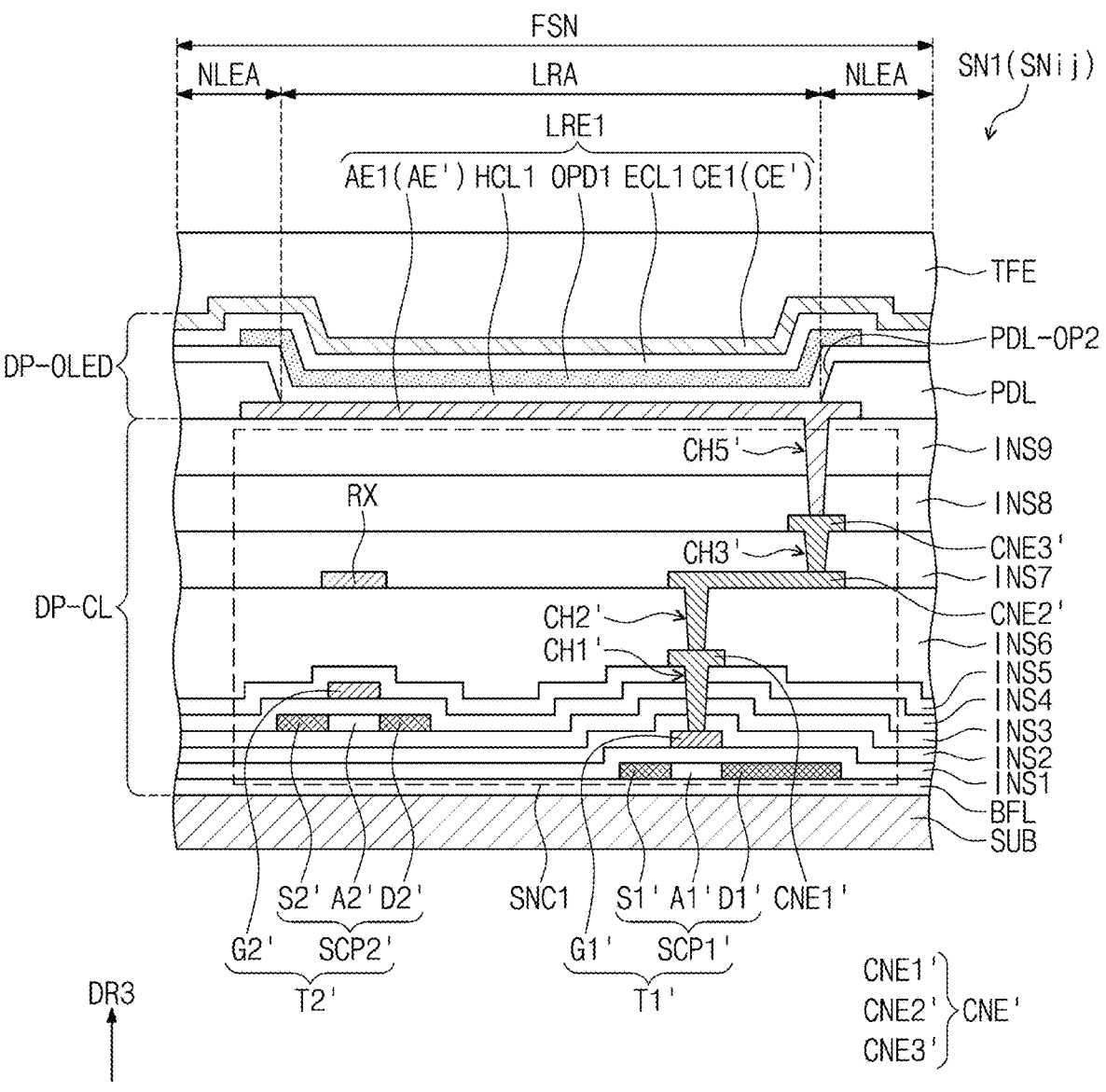

FIG. 9B is a cross-sectional view illustratively illustrating a cross section of a first optical sensor according to some embodiments of the present disclosure. In more detail, the first optical sensor SN1 illustrated in FIG. 9B may be the first optical sensor SN1 located at a position corresponding to a portion in which the read-out line RX (see FIG. 7) is located inside the fingerprint sensing area FSN (see FIG. 7) in FIG. 7. Hereinafter, a detailed description of the same configuration as that described in FIGS. 8 and 9A refers to the description of FIGS. 8 and 9A.

The read-out line RX may be located on the sixth insulating layer INS6. The read-out line RX may be located on the same layer and formed through the same process as those of the first vertical connection line GRC1 of FIG. 9A.

Figure 10:
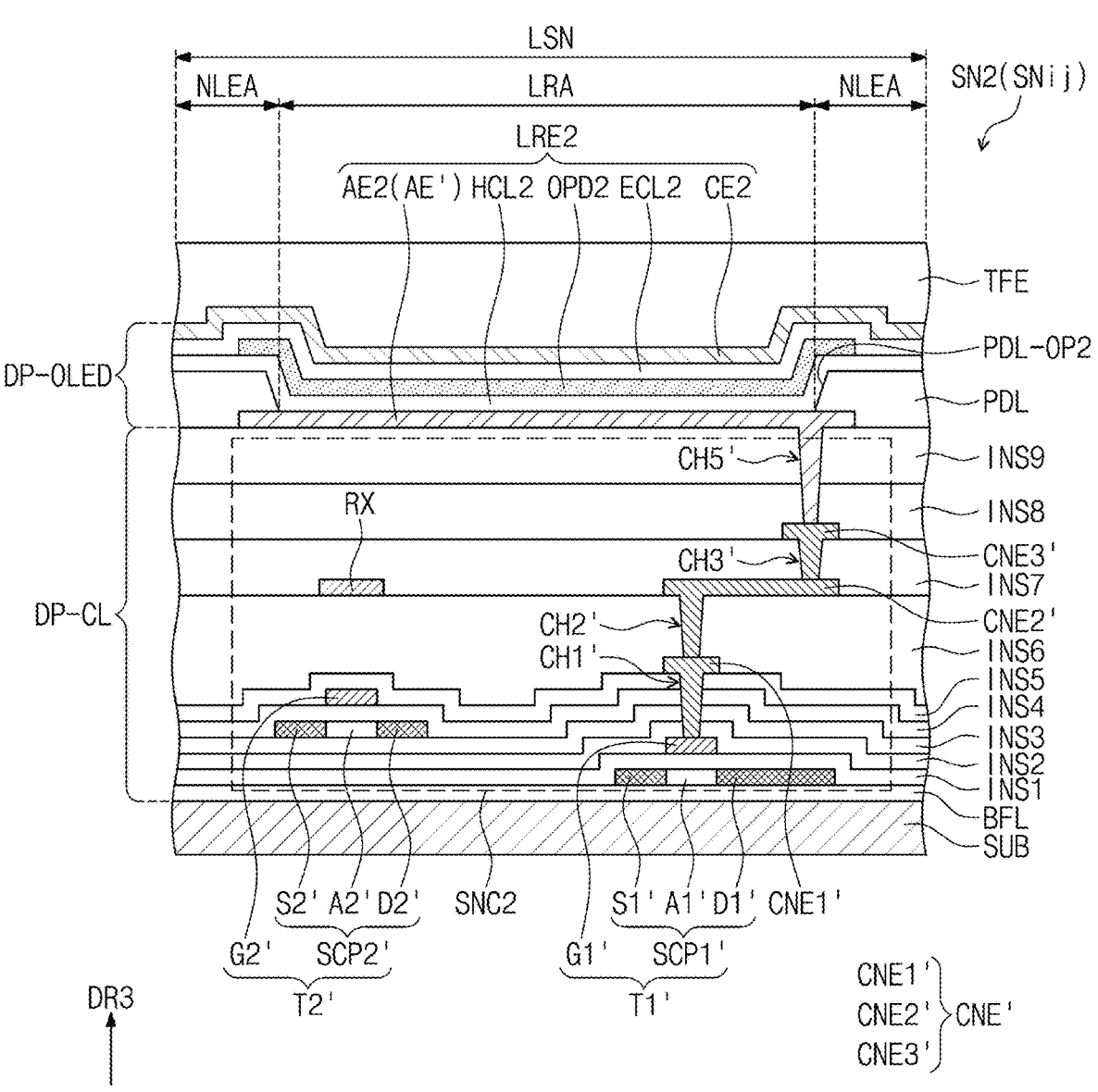
FIG. 10 is a cross-sectional view illustratively illustrating a cross section of a second optical sensor according to some embodiments of the present disclosure.

FIG. 10 is a cross-sectional view illustratively illustrating a cross section of a second optical sensor according to some embodiments of the present disclosure. In more detail, FIG. 10 illustratively illustrates a cross section of a second light sensing element LRE2 (or an illuminance sensing element) of the second optical sensor SN2 and the second sensor driving circuit SNC2 connected to the second light sensing element LRE2. Hereinafter, a detailed description of the same configuration as that described in FIGS. 8 to 9B refers to the description of FIGS. 8 to 9B.

A configuration of the second sensor driving circuit SNC2 may be the same as the configuration of the first sensor driving circuit SNC1 (see FIG. 9B) described in FIG. 9B. That is, the second sensor driving circuit SNC2 may include the first sensing transistor T1', the second sensing transistor T2', the connection electrode CNE, and the read-out line RX.

The second light sensing element LRE2 may include a first electrode AE2, a second electrode CE2, a hole control layer HCL2, an electron control layer ECL2, and a photoelectric conversion layer OPD2. The second light sensing element LRE2 may be located in the illuminance sensing area LSN. The first electrode AE2 may be the anode AE' illustrated in FIG. 5, and the second electrode CE2 may be the cathode CE' illustrated in FIG. 5. The second opening PDL-OP2, through which a portion (e.g., a set or predetermined portion) of the first electrode AE2 is exposed, may be defined in the pixel defining film PDL. The light receiving area LRA corresponds to the second opening PDL-OP2.

The first electrode AE2 is formed through the same process as the first electrode AE illustrated in FIG. 8. The second electrode CE2, the hole control layer HCL2, and the electron control layer ECL2 may be integrally formed with the second electrode CE, the hole control layer HCL, and the electron control layer ECL illustrated in FIG. 8. The second electrode CE2 of FIG. 10 and the second electrode CE of FIG. 8 may be different areas of a common electrode. The common electrode may be deposited to have an integral shape through an open mask. The hole control layer HCL2 in FIG. 10 and the hole control layer HCL in FIG. 8 may also be different areas of a common hole control layer, and electron control layer ECL2 in FIG. 10 and the electron control layer ECL in FIG. 8 may also be different areas of a common electron control layer.

Figure 11:
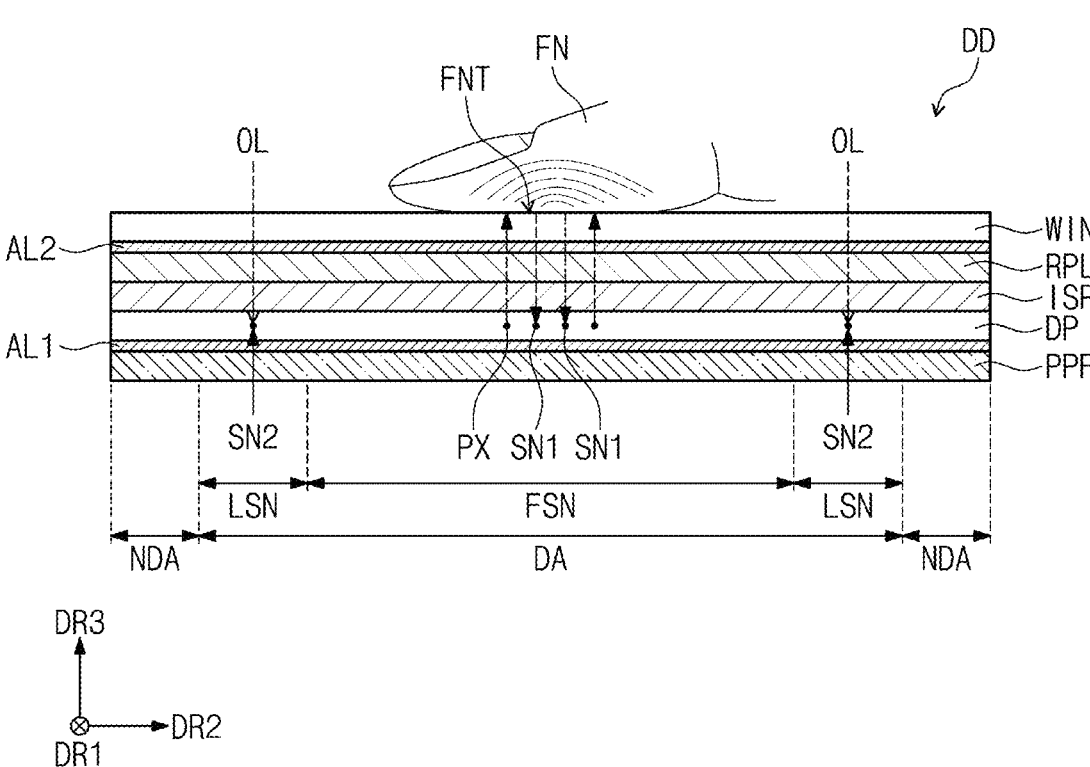
FIG. 11 is a view briefly illustrating a process of securing fingerprint information, which is biometric information, using an optical sensor according to some embodiments of the present disclosure.

FIG. 11 is a view illustrating aspects of a process of securing fingerprint information, which is biometric information, using an optical sensor according to some embodiments of the present disclosure.

Referring to FIG. 11, the display device DD may include the plurality of optical sensors SN1 and SN2. Each of the optical sensors SN1 and SN2 may have the same configuration as the optical sensor SNij illustrated in FIG. 5. The first optical sensors SN1 may sense a fingerprint FNT of a finger FN provided on the fingerprint sensing area FSN of the display panel DP. Lights generated by the light emitting elements OLED of the pixels PX may be provided to the fingerprint FNT and reflected by the fingerprint FNT. The fingerprint FNT is defined by a form of valleys and ridges, and optical reflectance rates of the valleys and the ridges are different from each other. The plurality of first optical sensors SN1 receive the lights reflected by the valleys and the ridges according to positions thereof. Information on the fingerprint FNT may be secured using information sensed by the plurality of first optical sensors SN1. An infrared blocking filter, which prevents or reduces instances of an infrared ray of an external light OL passing through the fingerprint FNT and being sensed by the first optical sensor SN1, may be located in the fingerprint sensing area FSN.

The second optical sensors SN2 may sense a luminance of the external light OL input into the illuminance sensing area LSN of the display panel DP. The second optical sensors SN2 may sense the infrared ray of the external light OL. A luminance of the light generated by the light emitting element OLED may be adjusted according to the luminance of the external light OL measured by the second optical sensors SN2.

Figure 12:
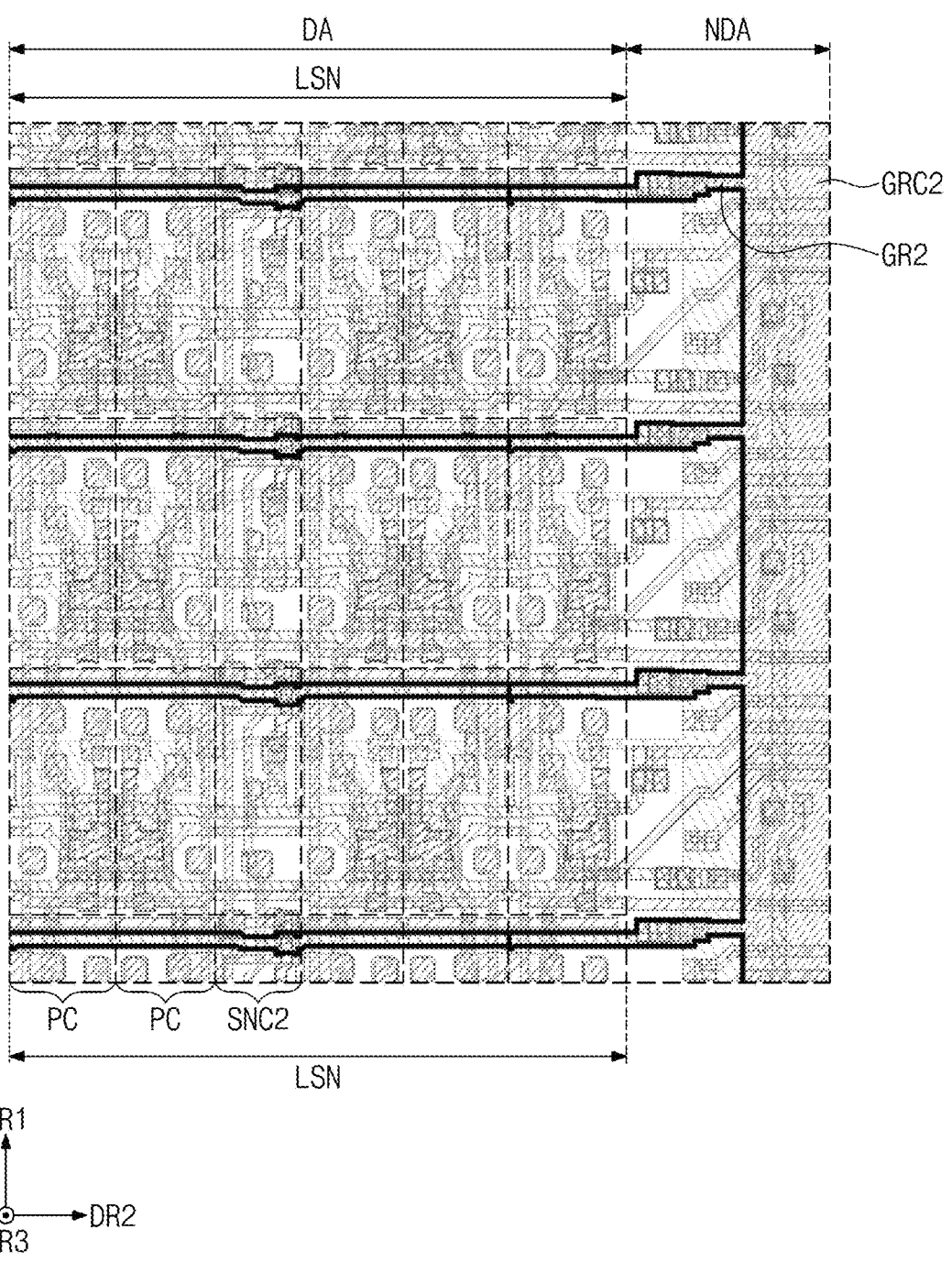
FIG. 12 is a plan view illustratively illustrating second reset control lines and second vertical connection lines in an illuminance sensing area according to some embodiments of the present disclosure.

FIG. 12 is a plan view illustratively illustrating second reset control lines and second vertical connection lines in an illuminance sensing area according to some embodiments of the present disclosure. FIG. 12 illustrates the pixel driving circuit PC and the second sensor driving circuit SNC2 adjacent to the illuminance sensing area LSN in the second direction DR2. The pixel driving circuit PC of FIG. 12 may correspond to an equivalent circuit of the pixel driving circuit PC (see FIG. 5) illustrated in FIG. 5, and the second sensor driving circuit SNC2 may correspond to an equivalent circuit of the optical sensor circuit SNC (see FIG. 5) illustrated in FIG. 5.

Referring to FIG. 12, the second reset control lines GR2 may extend in the second direction DR2 within the illuminance sensing area LSN. The second reset control lines GR2 may be connected to the second sensor driving circuit SNC2. It is illustrated that each of the second reset control lines GR2 is located above the second sensor driving circuit SNC2, but arrangement of each of the second reset control lines GR2 may be changed as a design of the circuit is changed.

The second vertical connection line GRC2 may overlap the non-display area NDA and extend in the first direction DR1. A thickness of the second vertical connection line GRC2 in the second direction DR2 may be increased to decrease resistance. Because the second vertical connection line GRC2 is located in the non-display area NDA and there is a sufficient space for circuit design, it may be possible to increase the thickness in this way.

The $i^{th}$ reset control signal GRSi (see FIG. 5) transmitted in the first direction DR1 through the second vertical connection line GRC2 may be transmitted to the second sensor driving circuit SNC2 in the second direction DR2 through the second reset control lines GR2. The second vertical connection line GRC2 and the second reset control lines GR2 may together serve as the $i^{th}$ reset control line GRi (see FIG. 5) of the illuminance sensor SN2 (see FIG. 6). The second vertical connection line GRC2 and the second reset control lines GR2 may be arranged on the same layer and may be formed in the same process.

Figure 13:
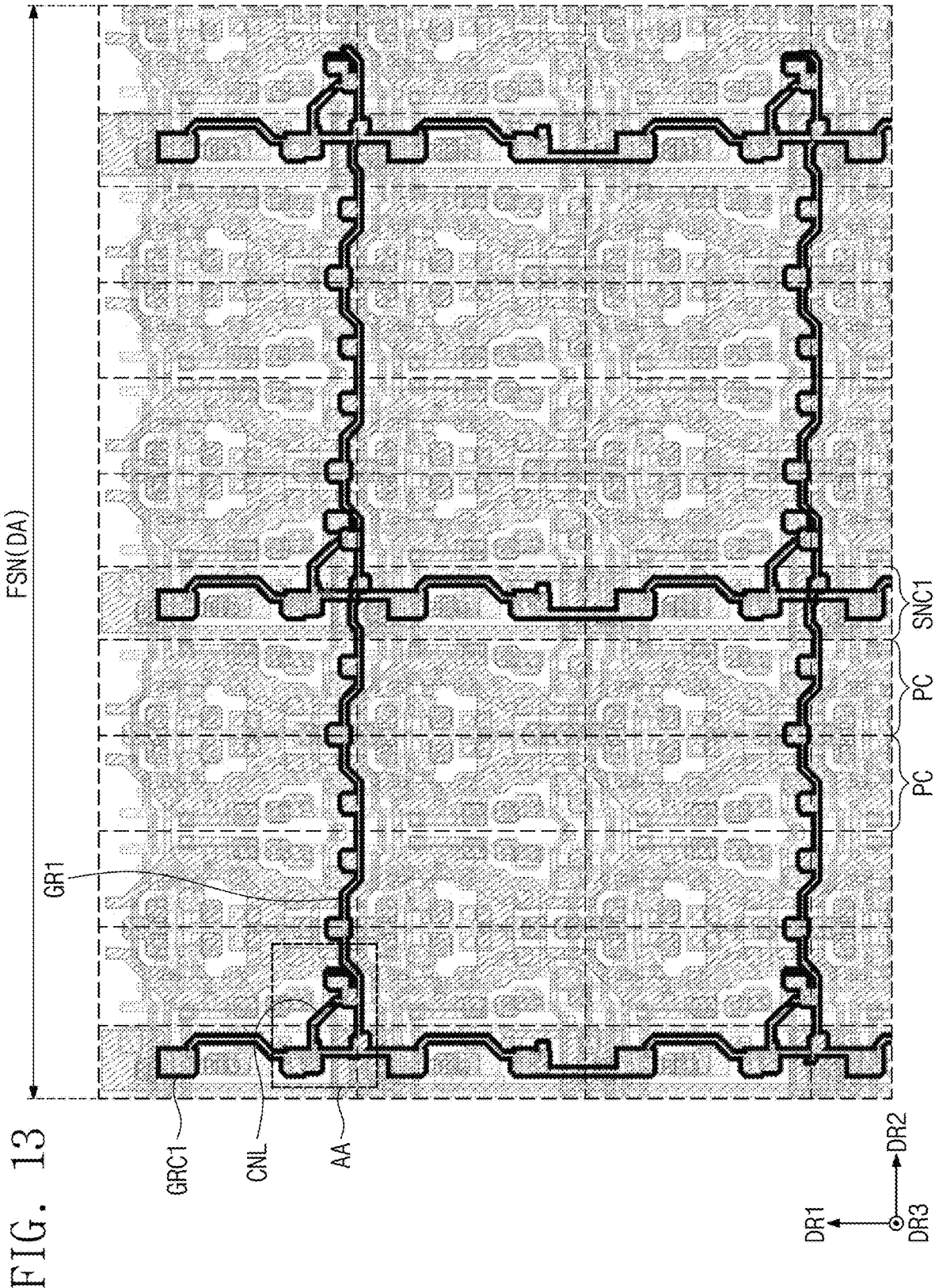
FIG. 13 is a plan view illustratively illustrating first reset control lines and first vertical connection lines in a fingerprint sensing area according to some embodiments of the present disclosure.

FIG. 13 is a plan view illustratively illustrating first reset control lines and first vertical connection lines in a fingerprint sensing area according to some embodiments of the present disclosure. FIG. 13 illustrates the pixel driving circuit PC and the first sensor driving circuit SNC1 adjacent to the fingerprint sensing area FSN in the second direction DR2. The pixel driving circuit PC of FIG. 13 may correspond to the equivalent circuit of the pixel driving circuit PC (see FIG. 5) illustrated in FIG. 5, and the first sensor driving circuit SNC1 may correspond to the equivalent circuit of the optical sensor circuit SNC (see FIG. 5) illustrated in FIG. 5.

Referring to FIG. 13, the first reset control lines GR1 may extend in the second direction DR2 within the fingerprint sensing area FSN. The first reset control lines GR1 may be connected to the first sensor driving circuit SNC1. It is illustrated that each of the first reset control lines GR1 is located below the first sensor driving circuit SNC1, but arrangement of each of the first reset control lines GR1 may be changed as a design of the circuit is changed.

The first vertical connection lines GRC1 may extend in the second direction DR2 within the fingerprint sensing area FSN. The first vertical connection lines GRC1 may intersect the first reset control lines GR1. Each of the first vertical connection lines GRC1 may be located in the fingerprint sensing area FSN of the display area DA, a space for circuit design is needed, and thus it is difficult to increase the thickness. Accordingly, the number of first vertical connection lines GRC1 may be increased to reduce resistance.

The $i^{th}$ reset control signal GRSi (see FIG. 5) transmitted in the first direction DR1 through the first vertical connection lines GRC1 may be transmitted to the first sensor driving circuit SNC1 in the second direction DR2 through the first reset control lines GR1. The first vertical connection lines GRC1 and the first reset control lines GR1 may together serve as the $i^{th}$ reset control line GRi (see FIG. 5) of the fingerprint sensor SN1 (see FIG. 6). The first vertical connection lines GRC1 and the first reset control lines GR1 may be arranged on different layers.

The bridge line CNL may connect the first vertical connection lines GRC1 and the first reset control lines GR1 on a plane. The bridge line CNL may be located on a different layer from those of the first vertical connection lines GRC1 and the first reset control line GR1. However, the bridge line CNL may be omitted as needed. For example, a contact hole may be formed at a point at which the first vertical connection lines GRC1 and the first reset control lines GR1 intersect each other, and thus the first vertical connection lines GRC1 and the first reset control lines GR1 may be directly connected through the contact hole.

Figure 14:
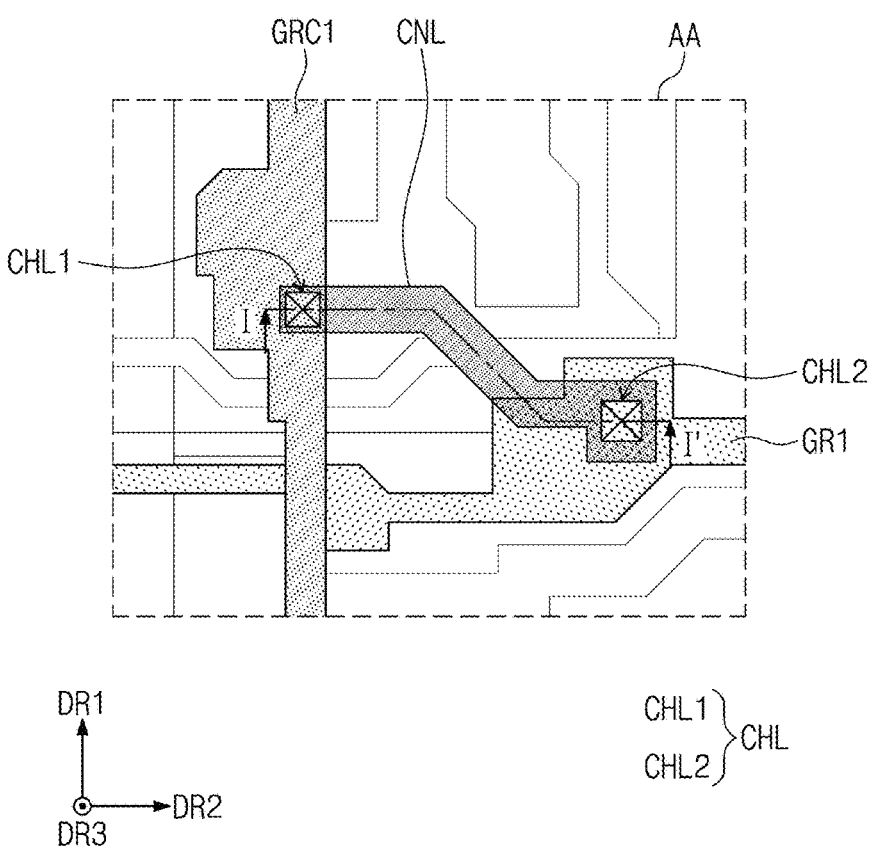
FIG. 14 is a plan view illustratively illustrating a connection relationship between the first reset control line and the first vertical connection line in the fingerprint sensing area according to some embodiments of the present disclosure.

FIG. 14 is a plan view illustratively illustrating a connection relationship between the first reset control line and the first vertical connection line in the fingerprint sensing area according to some embodiments of the present disclosure. In more detail, FIG. 14 is an enlarged plan view of area AA of FIG. 13.

Referring to FIG. 14, the first sensing contact hole CHL1 may be located adjacent to one end of the bridge line CNL. The second sensing contact hole CHL2 may be located adjacent to the other end of the bridge line CNL. The one end of the bridge line CNL may be electrically connected to the first vertical connection line GRC1 by the first sensing contact hole CHL1. The other end of the bridge line CNL may be electrically connected to the first reset control line GR1 by the second sensing contact hole CHL2.

Figure 15:
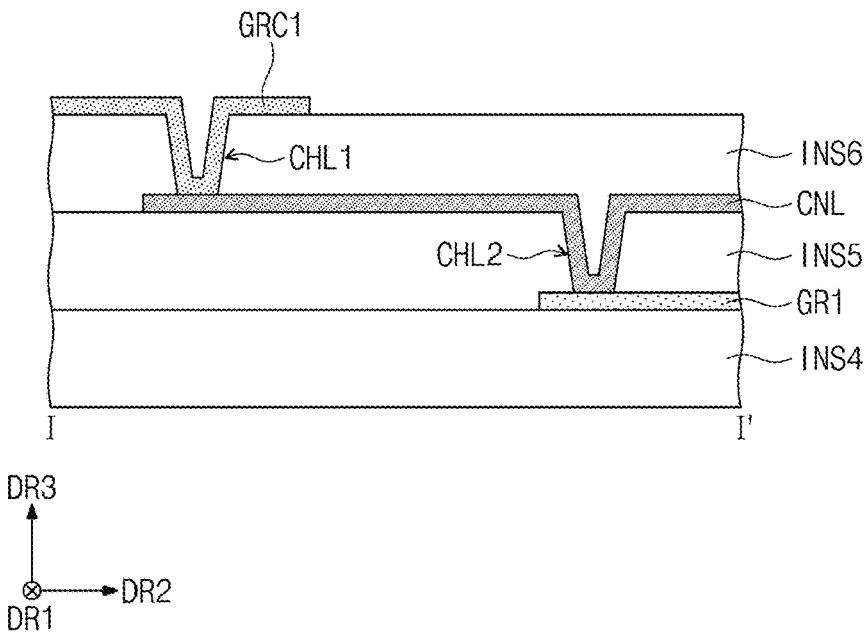
FIG. 15 is a cross-sectional view corresponding to the line I-I' of FIG. 14 according to some embodiments of the present disclosure.

FIG. 15 is a cross-sectional view corresponding to the line I-I' of FIG. 14 according to some embodiments of the present disclosure.

Referring to FIG. 15, the sensing contact hole CHL that connects the first reset control line GR1 and the first vertical connection line GRC1 may be defined in the plurality of insulating layers INS4, INS5, and INS6. The first reset control line GR1 may be located on the fourth insulating layer INS4. The bridge line CNL may be located on the fifth insulating layer INS5. The bridge line CNL may be connected to the first reset control line GR1 by the second sensing contact hole CHL2 passing through the fifth insulating layer INS5. The first vertical connection line GRC1 may be located on the sixth insulating layer INS6. The first vertical connection line GRC1 may be connected to the bridge line CNL through the first sensing contact hole CHL1 passing through the sixth insulating layer INS6.

Figure 16:
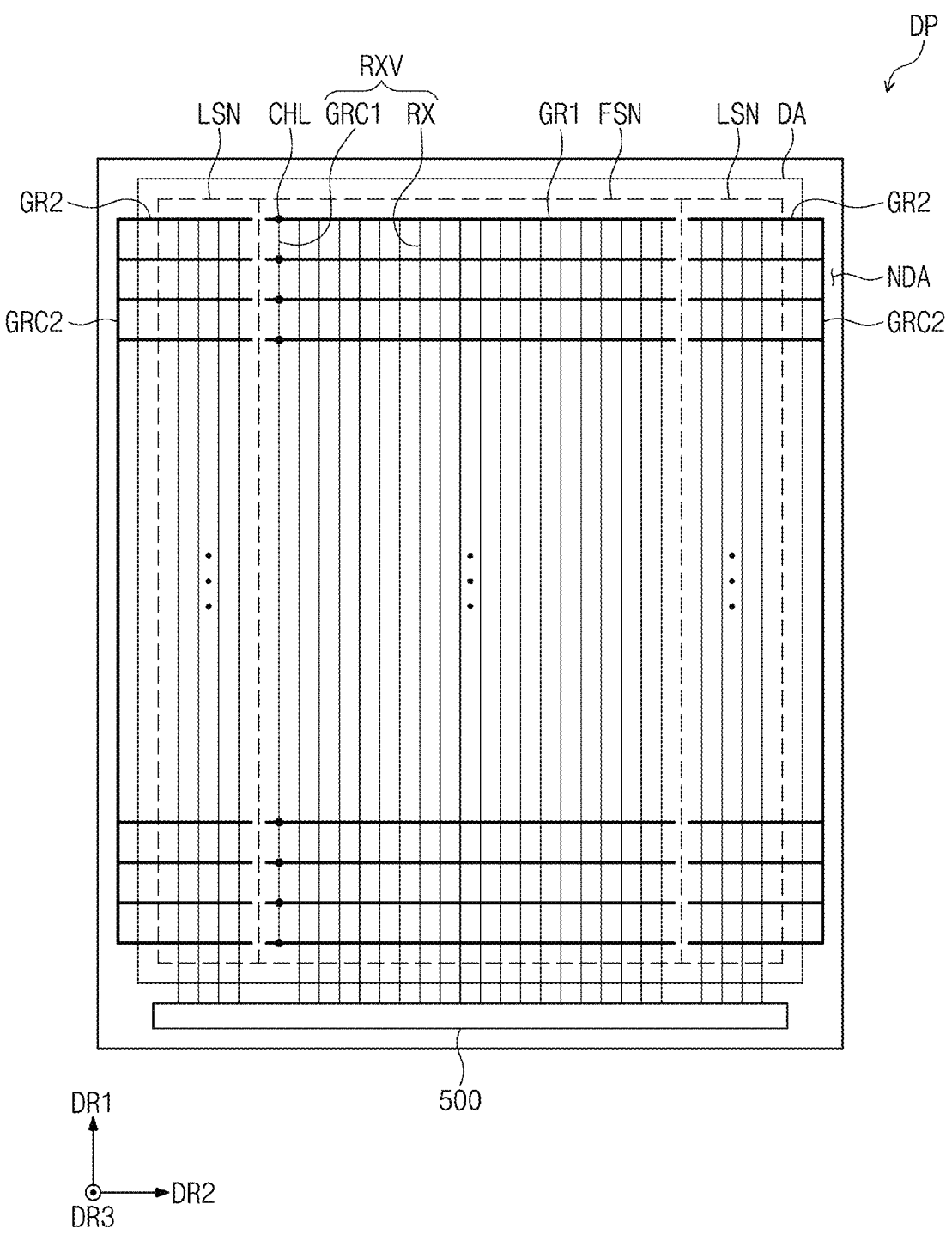
FIG. 16 is a plan view illustratively illustrating the arrangement of the reset lines, the vertical connection lines, and the read-out lines according to some embodiments of the present disclosure.

FIG. 16 is a plan view illustratively illustrating arrangement of reset lines, vertical connection lines, and read-out lines according to some embodiments of the present disclosure. Because the display panel DP of FIG. 16 is the same as the display panel DP illustrated in FIG. 7 except for the number of first vertical connection lines GRC1, a description of the same configuration will be omitted.

Referring to FIG. 16, the number of first vertical connection line GRC1 may be one. Even when there is only one first vertical connection line GRC1, the $i^{th}$ reset control signal GRSi (see FIG. 5) may be transmitted to all the plurality of first reset control lines GR1. Further, the number of first vertical connection lines GRC1 may be minimized to increase the number of read-out lines RX. Accordingly, the number of sensors that may not serve as a fingerprint sensor among the fingerprint sensors SN1 (see FIG. 6) may be minimized.

Figure 17:
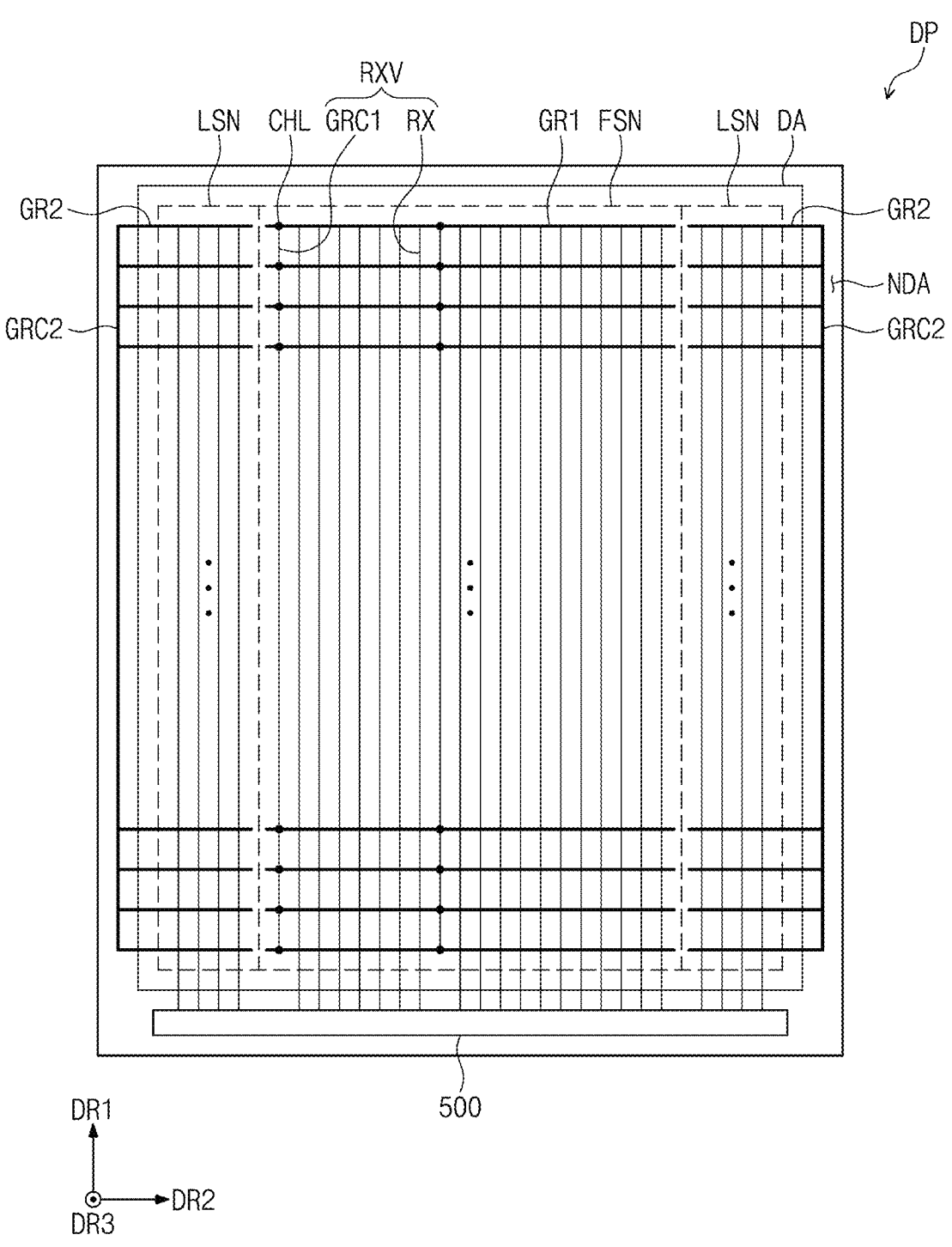
FIG. 17 is a plan view illustratively illustrating the arrangement of the reset lines, the vertical connection lines, and the read-out lines according to some embodiments of the present disclosure.

FIG. 17 is a plan view illustratively illustrating arrangement of reset lines, vertical connection lines, and read-out lines according to some embodiments of the present disclosure. Because the display panel DP of FIG. 17 is the same as the display panel DP illustrated in FIG. 7 except for the arrangement of the first vertical connection lines GRC1, some repetitive description of the same configuration may be omitted.

Referring to FIG. 17, the first vertical connection lines GRC1 may be arranged with the plurality of read-out lines RX interposed therebetween in the second direction DR2. In this way, the first vertical connection lines GRC1 may be arranged at a distance (e.g., a set or predetermined distance) or more, and thus it may be possible to prevent or reduce instances of the fingerprint sensor SN1 (see FIG. 6) failing to read out a fingerprint signal in a specific area.

Figure 18:
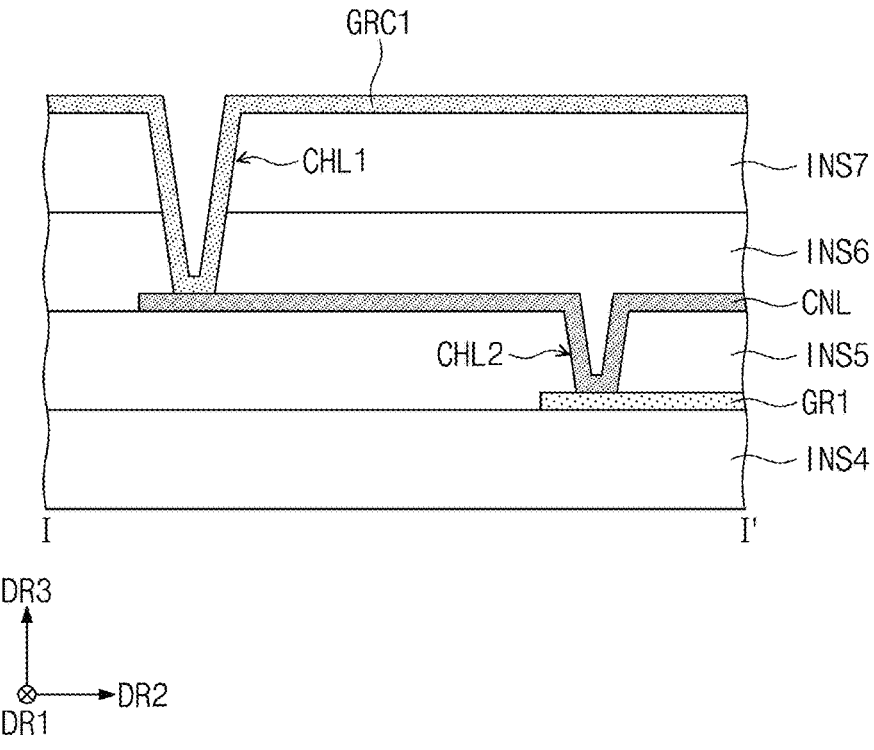
FIGS. 18 and 19 are cross-sectional views corresponding to the line I-I' of FIG. 14 according to some embodiments of the present disclosure.
Figure 19:
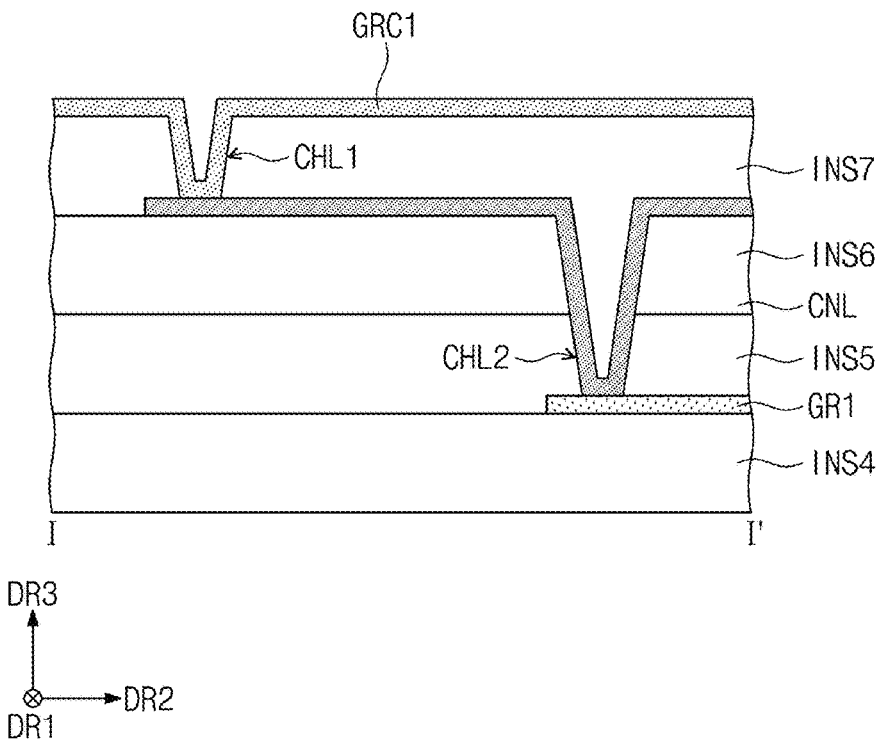

FIGS. 18 and 19 are cross-sectional views corresponding to line I-I' of FIG. 14 according to some embodiments of the present disclosure. Hereinafter, some repetitive description of the same configuration as the configuration described in FIG. 15 may be omitted.

Referring to FIG. 18, the first reset control line GR1 may be located on the fourth insulating layer INS4. The bridge line CNL may be located on the fifth insulating layer INS5. The bridge line CNL may be connected to the first reset control line GR1 by the second sensing contact hole CHL2 passing through the fifth insulating layer INS5. The first vertical connection line GRC1 may be located on the seventh insulating layer INS7. The first vertical connection line GRC1 may be connected to the bridge line CNL through the first sensing contact hole CHL1 passing through the sixth and seventh insulating layers INS6 and INS7. The first vertical connection line GRC1 may be located on the same layer and formed through the same process as the third connection electrode CNE3 (see FIG. 8).

Referring to FIG. 19, the bridge line CNL may be located on the sixth insulating layer INS6. The bridge line CNL may be located on the same layer and formed through the same process as the second connection electrode CNE2 (see FIG. 6). The bridge line CNL may be connected to the first reset control line GR1 through the second sensing contact hole CHL2 passing through the fifth and sixth insulating layer INS5 and INS6. The first vertical connection line GRC1 may be located on the seventh insulating layer INS7. The first vertical connection line GRC1 may be connected to the bridge line CNL through the first sensing contact hole CHL1 passing through the seventh insulating layer INS7.

Figure 20:
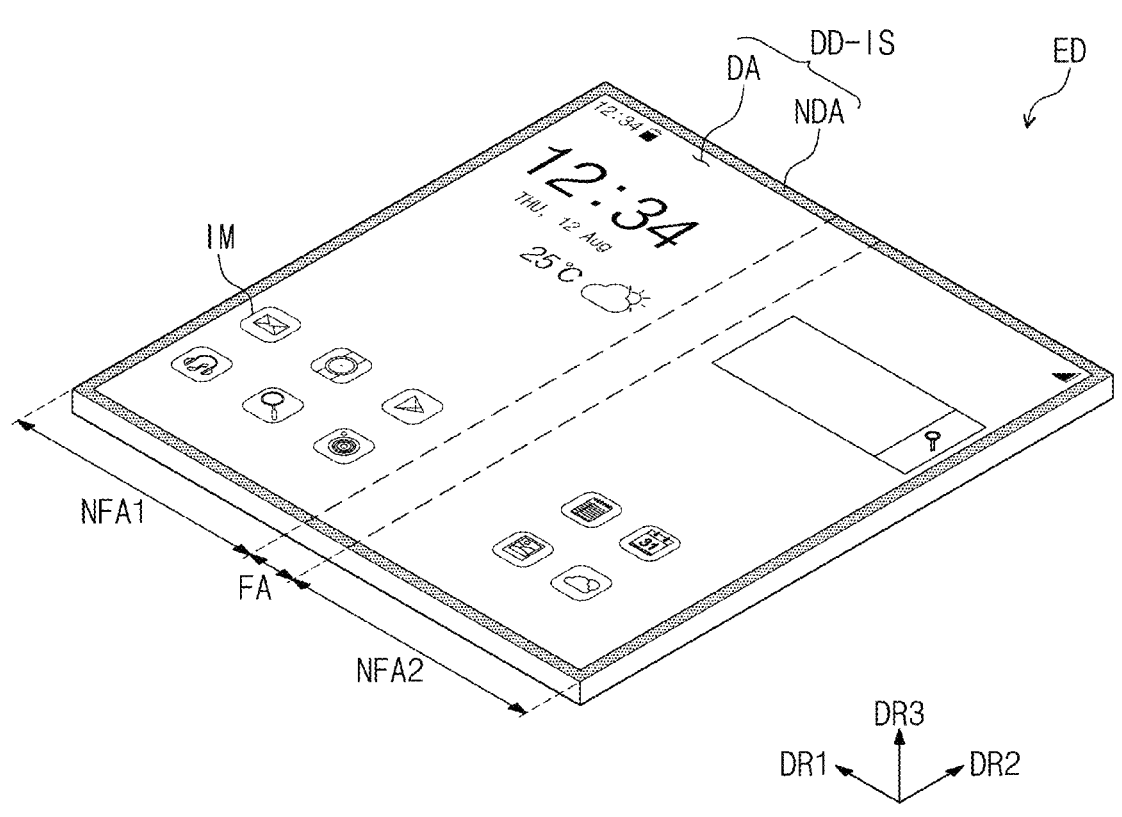
FIG. 20 is a perspective view of an electronic device according to an embodiment of the present disclosure.
Figure 21:
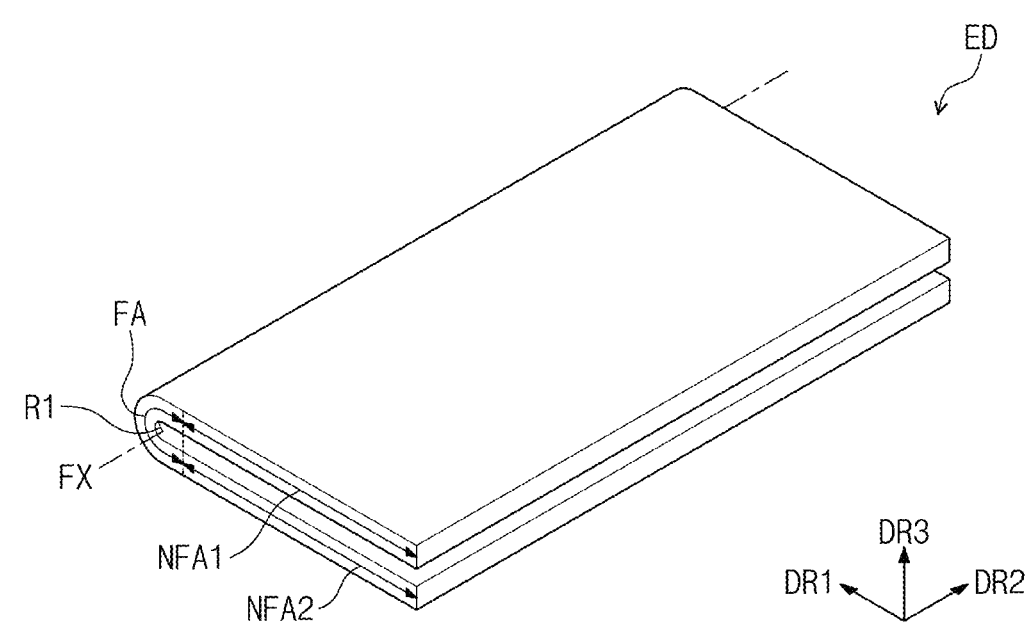
FIG. 21 is a view illustrating a folded state of the electronic device illustrated in FIG. 13.

FIG. 20 is a perspective view of an electronic device according to an embodiment of the present disclosure. FIG. 21 is a view illustrating a folded state of the electronic device illustrated in FIG. 20.

Referring to FIG. 20, an electronic device ED according to an embodiment of the present disclosure may have a rectangular shape having short sides extending in a first direction DR1 and long sides extending in a second direction DR2 intersecting the first direction DR1. However, the present disclosure is not limited thereto, and the electronic device ED may have various shapes such as a circular shape and a polygonal shape. The electronic device ED may be flexible.

Hereinafter, a direction substantially perpendicular to a plane defined by the first direction DR1 and the second direction DR2 is defined as a third direction DR3. Further, in the specification, the wording "when viewed on a plane" may be defined as a state of being viewed from the third direction DR3.

The electronic device ED may include a folding area FA and a plurality of non-folding areas NFA1 and NFA2. The non-folding areas NFA1 and NFA2 may include the first non-folding area NFA1 and the second non-folding area NFA2. The folding area FA may be disposed between the first non-folding area NFA1 and the second non-folding area NFA2. The folding area FA, the first non-folding area NFA1, and the second non-folding area NFA2 may be arranged in the first direction DR1.

Illustratively, one folding area FA and two non-folding areas NFA1 and NFA2 are illustrated, but the numbers of folding areas FA and the non-folding areas NFA1 and NFA2 are not limited thereto. For example, the electronic device ED may include more than two non-folding areas and a plurality of folding areas arranged between the non-folding areas.

An upper surface of the electronic device ED may be defined as a display surface DS, and the display surface DS may have the plane defined by the first direction DR1 and the second direction DR2. Images IM generated by the electronic device ED may be provided to a user through the display surface DS.

The display surface DS may include a display area DA and a non-display area NDA around the display area DA. The display area DA displays an image, and the non-display area NDA does not display the image. The non-display area NDA may surround the display area DA and may define an edge of the electronic device ED printed in a predetermined color.

Referring to FIG. 21, the electronic device ED may be a foldable electronic device ED that is folded or unfolded. For example, the folding area FA may be bent with respect to a folding axis FX parallel to the second direction DR2, and thus the electronic device ED may be folded. The folding axis FX may be defined as a long axis parallel to the long sides of the electronic device ED. When the electronic device ED is folded, the first non-folding area NFA1 and the second non-folding area NFA2 may face each other, and the electronic device ED may be in-folded so that the display surface DS is not exposed to the outside. However, an embodiment of the present disclosure is not limited thereto. For example, although not illustrated, the electronic device ED may be out-folded so that the display surface DS is exposed to the outside about the folding axis FX. Further, although not illustrated, the electronic device ED may be in-folded and out-folded at the same time.

Figure 22:
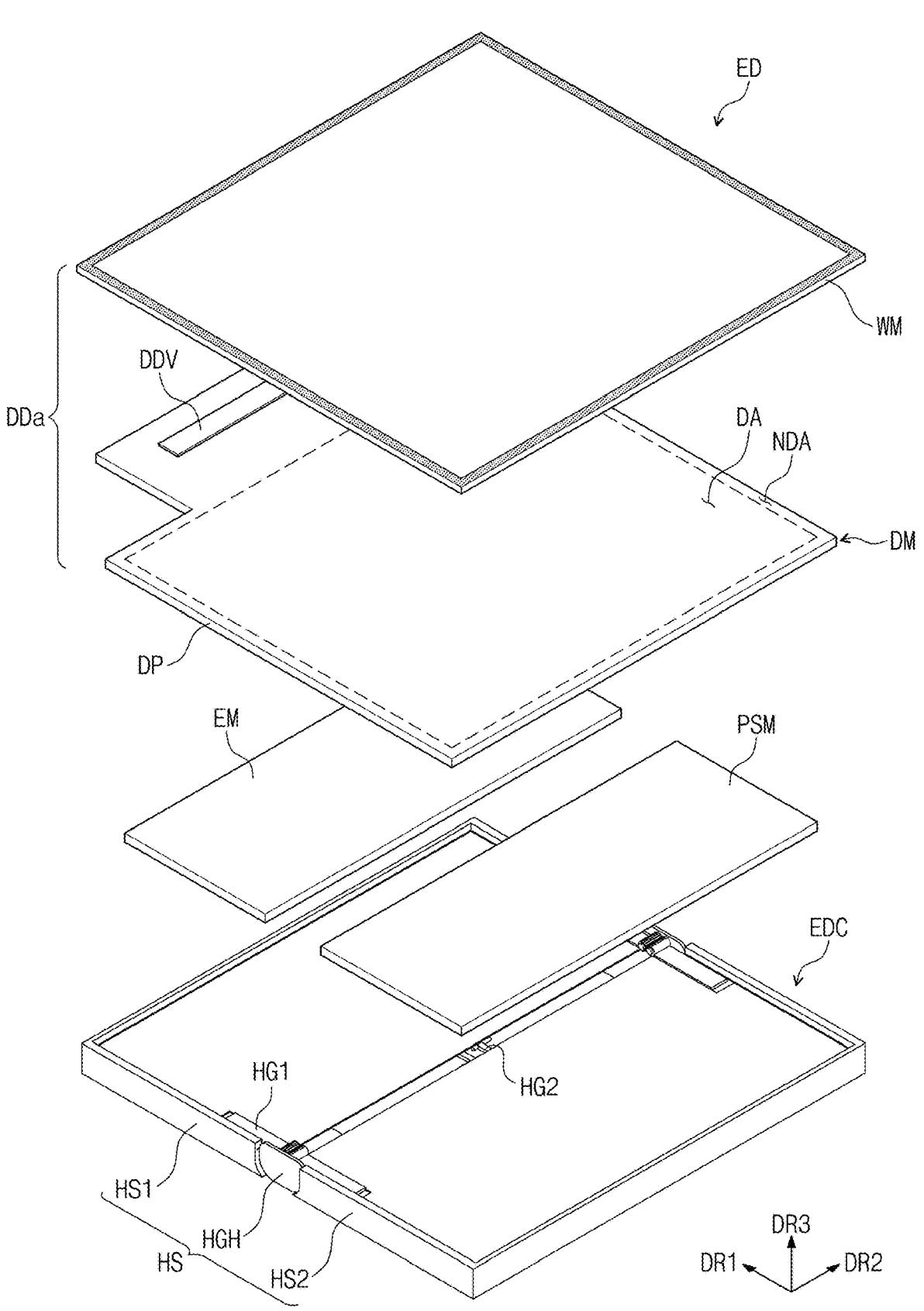
FIG. 22 is an exploded perspective view of the electronic device illustrated in FIG. 13.

FIG. 22 is an exploded perspective view of the electronic device illustrated in FIG. 20.

Referring to FIG. 22, the electronic device ED may include a display device DDa, an electronic module EM, a power supply module PSM, and a hinge module EDC. Although not illustrated, the electronic device ED may further include a mechanical structure (e.g., a hinge) for controlling a folding operation of the display device DDa. The hinge will be described in detail below.

The display device DDa may generate an image and sense an external input. The display device DDa may include a window module WM and a display module DM. The window module WM may provide a front surface of the electronic device ED. The window module WM may be disposed on the display module DM to protect the display module DM. The window module WM may transmit a light generated by the display module DM and provide the light to the user.

The display module DM may include a display panel DP. FIG. 22 illustrates only the display panel DP among laminated structures of the display module DM, but substantially, the display module DM may further include a plurality of components arranged on an upper side and a lower side of the display panel DP. The display panel DP may include a display area DA and a non-display area NDA corresponding to the display area DA and the non-display area NDA of FIG. 20 of the electronic device ED.

The display module DM may include a data driver DDV disposed on the non-display area NDA of the display panel DP. The data driver DDV may be directly manufactured in the form of a circuit chip and mounted on the non-display area NDA. However, the present disclosure is not limited thereto, and the data driver DDV may be mounted on a flexible circuit board connected to the display panel DP.

The electronic module EM and the power supply module PSM may be arranged inside the hinge module EDC. Illustratively, FIG. 22 illustrates a state in which the electronic module EM and the power supply module PSM are exposed to the outside from the hinge module EDC. Although not illustrated, the electronic module EM and the power supply module PSM may be connected to each other through a separate flexible circuit board. The electronic module EM may control an operation of the display device DDa. The power supply module PSM may supply power to the electronic module EM.

The hinge module EDC may accommodate the display device DDa, the electronic module EM, and the power supply module PSM. The hinge module EDC may include two first and second housings HS1 and HS2 for folding the display device DDa. The first and second housings HS1 and HS2 may extend in the second direction DR2 and may be arranged in the first direction DR1.

The hinge module EDC may include a housing assembly HS. The housing assembly HS may include the first housing HS1 and the second housing HS2 spaced apart from each other in the first direction DR1 and a hinge housing HGH disposed between the first housing HS1 and the second housing HS2. The hinge module EDC may further include hinges HG1 and HG2 for connecting the first and second housings HS1 and HS2, a plurality of main plates, and a plurality of moving plates.

Figure 23:
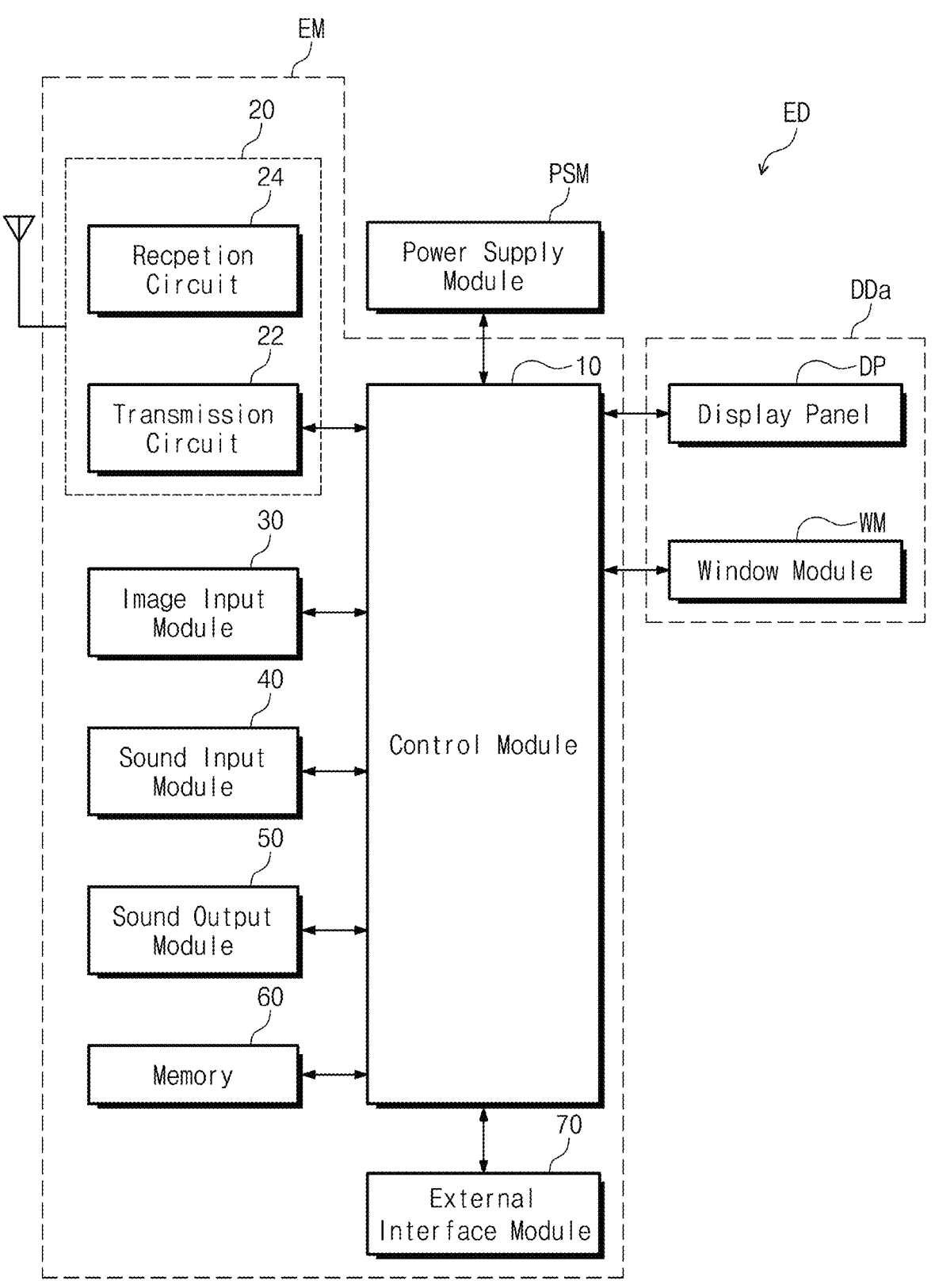
FIG. 23 is a block diagram of the electronic device illustrated in FIG. 22.

FIG. 23 is a block diagram of the electronic device illustrated in FIG. 22.

Referring to FIG. 23, the electronic device ED may include the electronic module EM, the power supply module PSM, and the display device DDa. The electronic module EM may include a control module 10, a wireless communication module 20, an image input module 30, a sound input module 40, a sound output module 50, a memory 60, an external interface module 70, and the like. The modules may be mounted on a circuit board or may be electrically connected through a flexible circuit board. The electronic module EM may be electrically connected to the power supply module PSM.

The control module 10 may control an overall operation of the electronic device ED. For example, the control module 10 may activate or deactivate the display device DDa in accordance with a user input. The control module 10 may control the image input module 30, the sound input module 40, the sound output module 50, and the like in accordance with the user input. The control module 10 may include at least one microprocessor.

The wireless communication module 20 may transmit/receive a wireless signal to/from another terminal using a Bluetooth line or a Wi-Fi line. The wireless communication module 20 may transmit/receive a voice signal using a general communication line. The wireless communication module 20 may include a transmission circuit 22 for modulating and transmitting a signal to be transmitted, and a reception circuit 24 for demodulating a received signal.

The image input module 30 may process an image signal and convert the image signal into image data that may be displayed on the display device DDa. The sound input module 40 may receive an external sound signal through a microphone in a recording mode or a voice recognition mode and convert the received external sound signal into electrical voice data. The sound output module 50 may convert sound data received from the wireless communication module 20 or sound data stored in the memory 60 and output the converted sound data to the outside.

The external interface module 70 may serve as an interface connected to an external charger, a wired/wireless data port, and a card socket (e.g., a memory card, a subscriber identity module (SIM)/user interface model (UIM) card).

The power supply module PSM may supply power required for an overall operation of the electronic device ED. The power supply module PSM may include a general battery device.

In a display device according to some embodiments of the present disclosure, reset lines of a fingerprint sensing area and reset lines of an illuminance sensing area are electrically insulated from each other, independent reset signals are applied to a fingerprint sensor and an illuminance sensor, and thus independent driving may be performed.

Further, because the reset lines of the fingerprint sensing area receive a signal while connected to some of the existing read-out lines, a separate line for applying a signal may be unnecessary.

Although the description has been made above with reference to aspects of some embodiments of the present disclosure, it may be understood that those skilled in the art or those having ordinary knowledge in the art may variously modify and change the present disclosure without departing from the spirit and scope of embodiments according to the present disclosure as described in the appended claims, and their equivalents. Thus, the scope of embodiments according to the present disclosure is not limited to the detailed description of the specification but should be defined by the appended claims, and their equivalents.

What is claimed is:

1. A display device comprising:
a base layer on which a display area including a fingerprint sensing area and an illuminance sensing area and a non-display area are defined;
a circuit layer on the base layer; and
an element layer on the circuit layer and including a light emitting element on the display area, a first light sensing element in the fingerprint sensing area, and a second light sensing element in the illuminance sensing area,
wherein the circuit layer includes:
a pixel driving circuit connected to the light emitting element;
a first sensor driving circuit connected to the first light sensing element;
a second sensor driving circuit connected to the second light sensing element;
a plurality of first reset control lines connected to the first sensor driving circuit, extending in a first direction, arranged in a second direction crossing the first direction, and electrically connected to each other; and
a plurality of second reset control lines connected to the second sensor driving circuit, extending in the first direction, arranged in the second direction, and electrically connected to each other, and
wherein the plurality of first reset control lines and the plurality of second reset control lines are electrically insulated from each other.

2. The display device of claim 1, wherein the plurality of first reset control lines are electrically connected by at least one first vertical connection line extending in the second direction, and
wherein the plurality of second reset control lines are electrically connected by at least one second vertical connection line extending in the second direction.

3. The display device of claim 1, wherein the illuminance sensing area is closer to an edge of the display area than the fingerprint sensing area.

4. The display device of claim 2, wherein the first vertical connection line is on a different layer from those of the plurality of first reset control lines.

5. The display device of claim 2, wherein the first vertical connection line is at least one line selected from vertical lines connected to the first sensor driving circuit, extending in the second direction, and arranged in the first direction.

6. The display device of claim 5, wherein the first vertical connection line is provided in plurality, and
wherein the plurality of first vertical connection lines are arranged to be biased to one side of the fingerprint sensing area.

7. The display device of claim 5, wherein, among the vertical lines, not-selected lines are read-out lines electrically connected to a read-out circuit that reads out a fingerprint sensing signal.

8. The display device of claim 2, further comprising:
a bridge line connecting the first vertical connection line and the plurality of first reset control lines in a plan view.

9. The display device of claim 8, wherein the bridge line is on a different layer from those of the first vertical connection line and the plurality of first reset control lines.

10. The display device of claim 8, further comprising:
a plurality of insulating layers on which a contact hole configured to electrically connect the first vertical connection line and the plurality of first reset control lines is defined.

11. The display device of claim 10, wherein the contact hole is provided in plurality,
wherein the contact hole includes:
a first contact hole adjacent to one end of the bridge line in the plan view and passing through some of the plurality of insulating layers; and
a second contact hole adjacent to another end of the bridge line in the plan view and passing through the others of the plurality of insulating layers, and
wherein the one end of the bridge line is electrically connected to the first vertical connection line by the first contact hole, and the another end of the bridge line is electrically connected to the plurality of first reset control lines by the second contact hole.

12. The display device of claim 10, wherein the plurality of insulating layers include:
a first insulating layer;
a second insulating layer on the first insulating layer; and
a third insulating layer on the second insulating layer, and
wherein the plurality of first reset control lines are on the first insulating layer, the first vertical connection line is on the third insulating layer, and the bridge line is on the second insulating layer.

13. The display device of claim 10, wherein the plurality of insulating layers include:
a first insulating layer;
a second insulating layer on the first insulating layer;
a third insulating layer on the second insulating layer; and
a fourth insulating layer on the third insulating layer, and
wherein the plurality of first reset control lines are on the first insulating layer, the first vertical connection line is on the fourth insulating layer, and the bridge line is on the second insulating layer or the third insulating layer.

14. The display device of claim 2, wherein the second vertical connection line overlaps the non-display area.

15. The display device of claim 2, wherein the second vertical connection line is on a same layer as that of the plurality of second reset control lines.

16. The display device of claim 2, wherein each of the first sensor driving circuit and the second sensor driving circuit includes:
a reset transistor including a first electrode configured to receive a reset voltage, a second electrode connected to a first sensing node, and a third electrode configured to receive a reset control signal;
an amplification transistor including a first electrode configured to receive a sensor driving voltage, a second electrode connected to the first sensing node, and a third electrode connected to a second sensing node; and
an output transistor including a first electrode connected to the second sensing node, a second electrode connected to a corresponding read-out line, and a third electrode configured to receive an output control signal.

17. The display device of claim 16, wherein the plurality of first reset control lines are connected to the third electrode of the reset transistor of the first sensor driving circuit, and
wherein the plurality of second reset control lines are connected to the third electrode of the reset transistor of the second sensor driving circuit.

18. A display device comprising:
a display panel including a display area in which a light emitting element, a fingerprint sensing element, and an illuminance sensing element are arranged, and a non-display area adjacent to the display area,
wherein the display panel includes:
a pixel driving circuit connected to the light emitting element;
a first sensor driving circuit connected to the fingerprint sensing element;
a second sensor driving circuit connected to the illuminance sensing element;
a plurality of first reset control lines connected to the first sensor driving circuit, extending in a first direction, and arranged in a second direction crossing the first direction; and
a plurality of second reset control lines connected to the second sensor driving circuit, extending in the first direction, and arranged in the second direction,
wherein the plurality of first reset control lines are electrically connected by at least one first vertical connection line extending in the second direction, and
wherein the plurality of second reset control lines are electrically connected by at least one second vertical connection line extending in the second direction.

19. The display device of claim 18, wherein the plurality of first reset control lines and the plurality of second reset control lines are electrically insulated from each other.

20. The display device of claim 18, wherein the plurality of first reset control lines and the first vertical connection line are on different layers, and
wherein the plurality of second reset control lines and the second vertical connection line are on a same layer.

21. An electronic device activated in response to electrical signals, comprising:
a display device folded or unfolded with respect to a folding axis extending in a first direction;
an electronic module overlapping the display device; and
a housing accommodating the display device,
wherein the display device comprising:
a base layer on which a display area including a fingerprint sensing area and an illuminance sensing area and a non-display area are defined;
a circuit layer on the base layer; and
an element layer on the circuit layer and including a light emitting element on the display area, a first light sensing element in the fingerprint sensing area, and a second light sensing element in the illuminance sensing area,
wherein the circuit layer includes:
a pixel driving circuit connected to the light emitting element;
a first sensor driving circuit connected to the first light sensing element;
a second sensor driving circuit connected to the second light sensing element;
a plurality of first reset control lines connected to the first sensor driving circuit, extending in a first direction, arranged in a second direction crossing the first direction, and electrically connected to each other; and
a plurality of second reset control lines connected to the second sensor driving circuit, extending in the first direction, arranged in the second direction, and electrically connected to each other, and
wherein the plurality of first reset control lines and the plurality of second reset control lines are electrically insulated from each other.

* * * * *